United States Patent
Hermoni et al.

(10) Patent No.: US 11,271,822 B1
(45) Date of Patent: Mar. 8, 2022

(54) SYSTEM, METHOD, AND COMPUTER PROGRAM FOR OPERATING MULTI-FEED OF LOG-DATA IN AN AI-MANAGED COMMUNICATION SYSTEM

(71) Applicant: Amdocs Development Limited, Limassol (CY)

(72) Inventors: Ofer Hermoni, Tenafly, NJ (US); Nimrod Sandlerman, Ramat Gan (IL); Eyal Felstaine, Herzliya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 496 days.

(21) Appl. No.: 16/280,367

(22) Filed: Feb. 20, 2019

Related U.S. Application Data

(60) Provisional application No. 62/648,287, filed on Mar. 26, 2018, provisional application No. 62/648,281, filed on Mar. 26, 2018, provisional application No. 62/642,524, filed on Mar. 13, 2018, provisional application No. 62/639,910, filed on Mar. 7, 2018, provisional application No. 62/639,923, filed on Mar. 7, 2018, provisional application No. 62/639,913, filed on Mar. 7, 2018, provisional application No. 62/660,142, filed on Apr. 19, 2018.

(51) Int. Cl.
*H04L 12/24* (2006.01)
*G06N 5/04* (2006.01)
*H04L 41/16* (2022.01)

(52) U.S. Cl.
CPC ............. *H04L 41/16* (2013.01); *G06N 5/048* (2013.01)

(58) Field of Classification Search
CPC ................................ H04L 41/16; G06N 5/048
See application file for complete search history.

(56) References Cited

U.S. PATENT DOCUMENTS

| | | | |
|---|---|---|---|
| 2008/0113786 A1* | 5/2008 | Alderucci | G07F 17/3241 463/29 |
| 2008/0170508 A1* | 7/2008 | Popiak | H04L 1/24 370/252 |
| 2015/0154502 A1* | 6/2015 | Qiu | G06N 5/048 706/47 |
| 2018/0212849 A1* | 7/2018 | Hobgood | G06F 11/30 |
| 2018/0234326 A1* | 8/2018 | Swierk | H04L 43/16 |
| 2019/0034829 A1* | 1/2019 | Guim Bernat | G06N 5/047 |

OTHER PUBLICATIONS

Hermoni et al., U.S. Appl. No. 16/280,513, filed Feb. 20, 2019.
Hermoni et al., U.S. Appl. No. 16/280,245, filed Feb. 20, 2019.
(Continued)

*Primary Examiner* — Wing F Chan
*Assistant Examiner* — Billy H Ng
(74) *Attorney, Agent, or Firm* — Zilka-Kotab, P.C.

(57) ABSTRACT

A system, method, and computer program product are provided for operating multi-feed of log data in an AI-managed communication system. In use, an identification of at least one artificial intelligence (AI) system and an identification of at least one AI model of a plurality of AI models used by the AI system are obtained. Additionally, a stream of log data is received, and a log data feed adapted to the AI model is created. Further, the log data feed is communicated using a corresponding AI model of the plurality of AI models.

10 Claims, 19 Drawing Sheets

(56) References Cited

OTHER PUBLICATIONS

Hermoni et al., U.S. Appl. No. 16/280,259, filed Feb. 20, 2019.
Hermoni et al., U.S. Appl. No. 16/280,265, filed Feb. 20, 2019.
Hermoni et al., U.S. Appl. No. 16/280,272, filed Feb. 20, 2019.
Hermoni et al., U.S. Appl. No. 16/280,279, filed Feb. 20, 2019.
Hermoni et al., U.S. Appl. No. 16/280,286, filed Feb. 20, 2019.
Hermoni et al., U.S. Appl. No. 16/280,301, filed Feb. 20, 2019.
Hermoni et al., U.S. Appl. No. 16/280,310, filed Feb. 20, 2019.
Hermoni et al., U.S. Appl. No. 16/280,312, filed Feb. 20, 2019.
Hermoni et al., U.S. Appl. No. 16/280,320, filed Feb. 20, 2019.
Hermoni et al., U.S. Appl. No. 16/280,353, filed Feb. 20, 2019.
Hermoni et al., U.S. Appl. No. 16/280,246, filed Feb. 20, 2019.
Hermoni et al., U.S. Appl. No. 16/280,260, filed Feb. 20, 2019.
Hermoni et al., U.S. Appl. No. 16/280,386, filed Feb. 20, 2019.
Hermoni et al., U.S. Appl. No. 16/280,634, filed Feb. 20, 2019.

\* cited by examiner

SYSTEM, METHOD, AND COMPUTER PROGRAM FOR OPERATING MULTI-FEED OF LOG-DATA IN AN AI-MANAGED COMMUNICATION SYSTEM

RELATED APPLICATIONS

The present application claims priority to: U.S. Provisional Application No. 62/639,910, entitled "SYSTEM, METHOD, AND COMPUTER PROGRAM FOR IMPLEMENTING PRUNING RULES IN AN ARTIFICIAL INTELLIGENCE (AI) BASED NETWORK MANAGEMENT SYSTEM," filed on Mar. 7, 2018; U.S. Provisional Application No. 62/639,913, entitled "SYSTEM, METHOD, AND COMPUTER PROGRAM FOR DAMPING A FEEDBACK LOAD-CHANGE IN A COMMUNICATION NETWORK MANAGED BY AN AUTOMATIC NETWORK MANAGEMENT SYSTEM," filed on Mar. 7, 2018; U.S. Provisional Application No. 62/639,923, entitled "SYSTEM, METHOD, AND COMPUTER PROGRAM FOR IMPLEMENTING A MARKETPLACE FOR ARTIFICIAL INTELLIGENCE (AI) BASED MANAGED NETWORK SERVICES," filed on Mar. 7 2018; U.S. Provisional Application No. 62/642,524, entitled "A METHOD AND A SYSTEM FOR MITIGATING AN ATTACK ON A NETWORK BY EFFECTING FALSE ALARMS," filed on Mar. 13, 2018; U.S. Provisional Application No. 62/648,281, entitled "SYSTEM, METHOD, AND COMPUTER PROGRAM FOR AUTOMATICALLY GENERATING TRAINING DATA FOR ANALYZING A NEW CONFIGURATION OF A COMMUNICATION NETWORK," filed on Mar. 26, 2018; U.S. Provisional Application No. 62/648,287, entitled "SYSTEM, METHOD, AND COMPUTER PROGRAM FOR IMPLEMENTING A MARKETPLACE FOR EDGE COMPUTING," filed on Mar. 26, 2018; and U.S. Provisional Application No. 62/660,142, entitled "SYSTEM, METHOD, AND COMPUTER PROGRAM FOR MITIGATING FALSIFIED LOG DATA PROVIDED TO AN AI-LEARNING SYSTEM MANAGING A COMMUNICATION NETWORK," filed on Apr. 19 2018, the entire contents of each of the listed applications which are incorporated herein by reference.

FIELD OF THE INVENTION

The present invention relates to telecommunications and/or data communications, and more particularly to network management using artificial intelligence (AI).

BACKGROUND

A modern public digital communication network provides many communication-related services to a very large number of customers where each customer may use a variety of services. Additionally, each service may be used by each customer in a variety of ways. In one embodiment, the business needs of many customers may rapidly change, thereby affecting the manner in which the communication services may be used. As such, business dynamics (and especially increasing business dynamics) may affect the network dynamics, as well as the configuration of the network and the network's services.

A communication network may have a very large number of network situations which may need to be detected (possibly in parallel), and which may include detailed log data. The log data may be continuously produced by the communication network in real-time, and may change constantly in terms of both structure and content. As such, the network system may need to repetitively search for a constantly evolving network situation in a data stream of changing structure.

As such, there is thus a need for addressing these and/or other issues associated with the prior art.

SUMMARY

A system, method, and computer program product are provided for operating multi-feed of log-data in an AI-managed communication system. In use, an identification of at least one artificial intelligence (AI) system and an identification of at least one AI model of a plurality of AI models used by the AI system are obtained. Additionally, a stream of log data is received, and a log data feed adapted to the AI model is created. Further, the log data feed is communicated using a corresponding AI model of the plurality of AI models.

DETAILED DESCRIPTION

Figure 1:
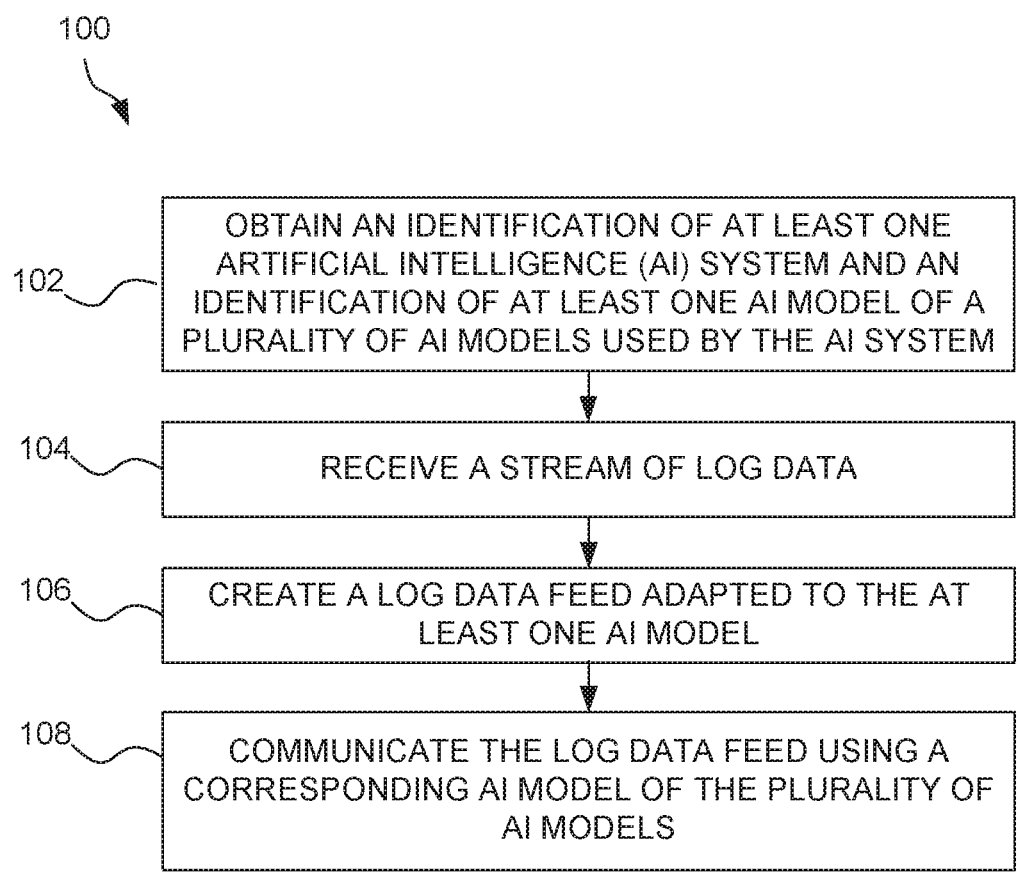
FIG. 1 illustrates a method for operating multi-feed of log-data in an AI-managed communication system, in accordance with one embodiment.

One purpose of Network Function Virtualization (NFV) is to implement as many functions of the network as software running over a generic computer. As such, a virtual(ized) network function (VNF) can be instantiated almost anywhere on the network, based on a network/cluster of generic computers. This ability to instantiate VNFs allows network functions to be migrated throughout the network, which in turn, may lead to network reconfiguration. Additionally, fast migration and network reconfiguration may provide cost savings in both capital spending (CAPEX) and operational spending (OPEX).

In the context of the present description, the term "cost" may refer to any type of expenditure (such as associated with increased capital expenditure (CAPEX), and/or increased operational expenditure (OPEX)), as well as decreased revenues or a limitation on revenue increase. In one embodiment, OPEX may include, for example, a cost of electricity to power any network entity and/or dissipate heat resulting from the operation of any network entity. Additionally, OPEX may also include payment to any third party for using any type of hardware and/or software, including processing power, storage, transmission, etc.

Further, in the context of the present description, the term service configuration" may refer to a network configuration applicable for a particular service. Such particular service may be requested by, and/or proposed to, a particular customer (herein referred to as "requesting party"), for a specific time period, locality, and/or business structure. As such, a service configuration may apply to an entire basis or subset of a communication network(s).

For example, instead of planning a network to a combined worst case (such as a highest expected cumulative demand), CAPEX can be reduced by more accurately planning the network according to an optimized, time-dependent configuration. Thereafter, OPEX can be reduced in periods of low demand by migrating the operating VNFs to one or more central locations and shutting down unused data centers. This cost saving may be one the driving forces behind NFV. Therefore, fast and effective reconfiguration of the network may be a key element in the evolution of NFV and the telecom market.

In addition, the ability to reconfigure the network quickly (and cost effectively) may enable network operators to introduce new services faster, reduce time-to-market, and reduce onboarding costs. Fast and automatic reconfiguration also enable customers to place a demand for a service (e.g., a service level agreement or SLA) shortly before actual use, and request the service for a limited time. Together, fast and automatic reconfiguration may reduce the time and cost of doing business between network operators, operators of software service(s), and/or customers (such as consumers).

The network may be expected to adapt to a constant flow of service demands by continuously optimizing and reconfiguring the network. An optimized network (configuration) may include a network that runs close to its current maximum capacity while providing all required services (based on service level agreements (SLAs) or a similar form of service requirements definition). As the actual (real-time) demand changes, the network configuration may be changed, both by adding or removing infrastructure (e.g., turning hardware on or off), and by migrating and instantiating, or removing VNFs.

The network management system should be able to predict situations requiring network reconfiguration early enough to enable the network to compute the optimized new configuration and effect (orchestrate) it before the actual need arises. Due to the network complexity and the speed of change of demands, the use of artificial intelligence (AI) may be required to meet such a technical demand.

As such, the network management system may generally relate to telecommunications and/or data communications, and, more particularly to the management of a telecommunication network and/or a data network, and, more particularly to network management using artificial intelligence (AI). Further, in one embodiment, the network management may relate to training, testing and operating AI-models to detect particular network situation using parallel feeds of log data, by adapting each log-data feed to a corresponding AI-model.

The present embodiments comprise a method and/or a system for automatically preparing data for training an AI-learning system to create an AI-model for use by an AI-analysis system. In one embodiment, the AI-analysis system may detect a network situation in the log data of a communication network, and which may be used to prepare testing data. More particularly, the present embodiments comprise a method and/or a system for automatically operating an AI-analysis system using a plurality of AI-models in parallel to detect network situations in a respective plurality of log data feeds, where each of the log data feeds may be adapted and/or optimized to a respective AI-model.

In one embodiment, a multi-feed system may be used to reduce an amount of processing load on a real time AI analysis system by eliminating unnecessary data from input data stream. Additionally, multi-feed system may be used to provide the real time AI analysis system with an input data stream of a more stable structure, by eliminating unnecessary data. In so doing, a probability that a real time AI analysis system may detect a classifier and/or a network situation is increased.

Each feed of the multi-feed system may be adapted to the AI-model that is processing the feed. As such, each AI-model may have a different set of necessary data, which may be derived from the log data. In this manner, the multi-feed system may produce a plurality of parallel feeds, which may then be processed (in parallel) simultaneously, where each feed is associated with a respective AI-model.

FIG. 1 illustrates a method 100 for operating multi-feed of log-data in an AI-managed communication system, in accordance with one embodiment. As shown, an identification of at least one artificial intelligence (AI) system and an identification of at least one AI model of a plurality of AI models used by the AI system is obtained. See operation 102.

In one embodiment, the corresponding AI model may be configured to detect a classifier in the log data. In another embodiment, for the corresponding AI model, a plurality of parameters of the log data which are processed by the corresponding AI model may be obtained. In the context of the present description, the classifier may include any pattern or marker associated with the log data.

Additionally, a stream of log data is received. See operation 104. In one embodiment, the log data may include parameters associated with an operation of network entities of the communication network and a time of reporting. Additionally, a network situation based on the log data may be identified, and a resolution level may be identified. Further, based on the network situation and the resolution level, a feed channel of the log data feeds for a first particular AI model may be initiated, the feed channel including corresponding monitoring rules and corresponding parameter characterization. Further, in one embodiment, the initiation step may be repeated for all AI models of the plurality of AI models that correspond to the network situation and the resolution level.

Further, a log data feed adapted to the at least one AI model is created. See operation 106. In one embodiment, the log data feed (and/or each of the log data feeds used) may include parameters associated with the corresponding AI model. In another embodiment, the log data feed may be refined to include only parameters processed by the corresponding AI model. Additionally, the plurality of AI models simultaneously operated, each of the AI models processing a corresponding log data feed.

In another embodiment, a first confidence level may be computed for at least one first AI model, the first confidence level representing at least one of: a probability of the at least one AI model for detecting a first classifier of the log data feed; or a probability of the at least one AI model for detecting a network situation. In addition, the first classifier may precede the network situation. Further, at least one parameter may be eliminated from the log data feed to form a second log data feed, and the second log data feed may be analyzed using a corresponding second AI model.

In yet another embodiment, a second confidence level for the second AI model may be computed, the second confidence level representing at least one of: a probability of the second AI model for detecting a second classifier of the second log data feed, or a probability of the second AI model for detecting a second network situation. In still another embodiment, it may be determined that the second confidence level is higher than the first confidence level, and at least one second parameter from the second log data feed may be eliminated to form a third log data feed. Furthermore, the third log data feed may be analyzed using a corresponding third AI model, a third confidence level for the third AI model may be computed, where the third confidence level represents at least one of: a probability of the third AI model for detecting a third classifier of the third log data feed, or a probability of the third AI model for detecting a third network situation.

Additionally, it may be determined that the third confidence level is higher than the second confidence level, and at least one third parameter may be eliminated from the third log data feed to form a fourth log data feed. In addition, the log data feed is communicated using a corresponding AI model of the plurality of AI models. See operation 108.

Figure 2A:
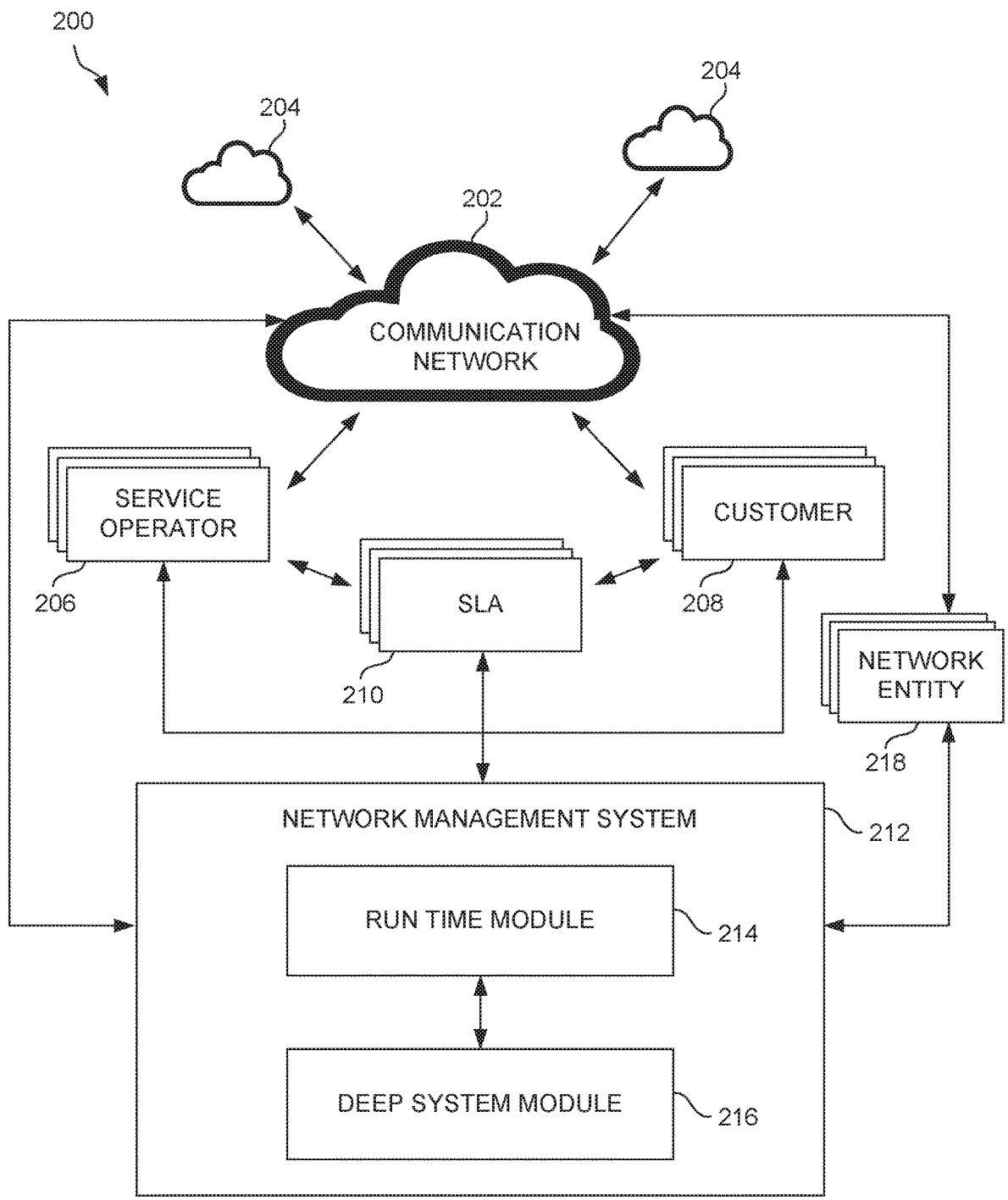
FIG. 2A illustrates a communication network and network management system, in accordance with one embodiment.

FIG. 2A illustrates a communication network and network management system 200, in accordance with one embodiment. As an option, the network management system 200 may be implemented in the context of any one or more of the embodiments set forth in any previous and/or subsequent figure(s) and/or description thereof. Of course, however, the network management system 200 may be implemented in the context of any desired environment. Further, the aforementioned definitions may equally apply to the description below.

In one embodiment, the communication network and network management system 200 may relate to managing a communication network using artificial intelligence (AI).

As shown, the network management system 200 includes a communication network 202, one or more secondary networks 204, a network management system 212 including a run-time module 214 and a deep system module 216. In one embodiment, the one or more secondary networks 204 may be communicatively coupled to the communication network 202.

Communication network 202, and/or any of the one or more secondary networks 204 may be associated with one or more service operators 206 (such as operators of third-party services such as software as a service (SaaS)), customers (such as communication customers 208 and/or consumers using the services of communication network 202 or any of the software services of service operators 206). In one embodiment, a customer of the communication network 202 may be a service operator (such as service operators 206) or a service consumer (such as the communication customers 208). Both the service operator or the service consumer may use services of the communication network 202, as well as services provided by a service provider. Further, the communication network 202 may be connected directly to the network management system 212, and/or may be connected to one or more network entities 218.

In one embodiment, the service operators 206 and/or the communication customers 208 may have an arrangement and/or agreement with an operator of communication network 202, such as one or more service level agreements (SLAs) 210, which may define various parameters of the service(s) provided by communication network 202.

In the context of the present description, the term "communication network", and/or simply "network", may refer to any type of network, including analog and/or digital communication networks, wired and/or wireless communication networks, wide area network (WAN), local area network (LAN), personal area network (PAN), etc., as well as combinations thereof. For example, network may refer to a public service telephony network (PSTN), a public service data network (PSDN), a public land mobile network (PLMN), cellular network, and/or cable network, as well as any other network type and any combination thereof. Further, the term network may include communication hardware, communication software and/or both.

A network may also refer to a sub-network, any type of a part of a network, or a combination of networks, and/or sub-networks, any of which may be overlying and/or overlapping one or more networks and/or subnetworks (such as a virtual network, and/or a network slice, etc.).

In one embodiment, a network may be operated by a network operator, a virtual network operator (VNO), a mobile virtual network operator (MVNO), a business enterprise operating one or more communication services, a business enterprise subscribing to one or more communication networks, one or more virtual communication networks, and/or one or more communication services, etc.

In the context of the present description, the term "network entity" may refer to any type of communication hardware, communication software, and/or communication service including instances of any particular software and/or service. For example, network entity may refer to software executed by a network entity (such as a network node or server), an operating-system (OS), a hypervisor software, a virtual machine, a container, a virtual network function (VNF), a micro-service, etc.

Further, in the context of the present description, the term "network configuration" may refer to any type of arrangement, configuration, topology, etc., of a network, interconnected computing devices (such as cloud computing), network nodes, servers, network entities, etc. In one embodiment, the network configuration may relate to a part (or slice) of a network, or a sub-network. Additionally, network configuration may also refer to any type of arrangement, deployment, installation, instantiation, etc. of any type of software processed and/or executed by any computational entity in the network.

In one embodiment, network configuration may refer to a configuration of any part of a network, or a combination of network, including network slicing, self-organizing networks (SON), edge computing, etc. Network configuration may also include configuration of any type of "communication service", which may include one or more network hardware elements as well as one or more software packages installed and operative in one or more hardware elements of the network.

In the context of the present description, "network service" may refer to any combination of network or communication services, facilities, or resources, as well as associated parameters such as bandwidth, latency, jitter, etc. For example, a network service may include any type of computing services, facilities, resources, as well as their parameters such as processing power, memory, storage, etc. Further, in one embodiment, network service may include a communication service, such as required network service, proposed network service, and/or communication service requirements (such as requirements specified in the SLAs 210).

Figure 2B:
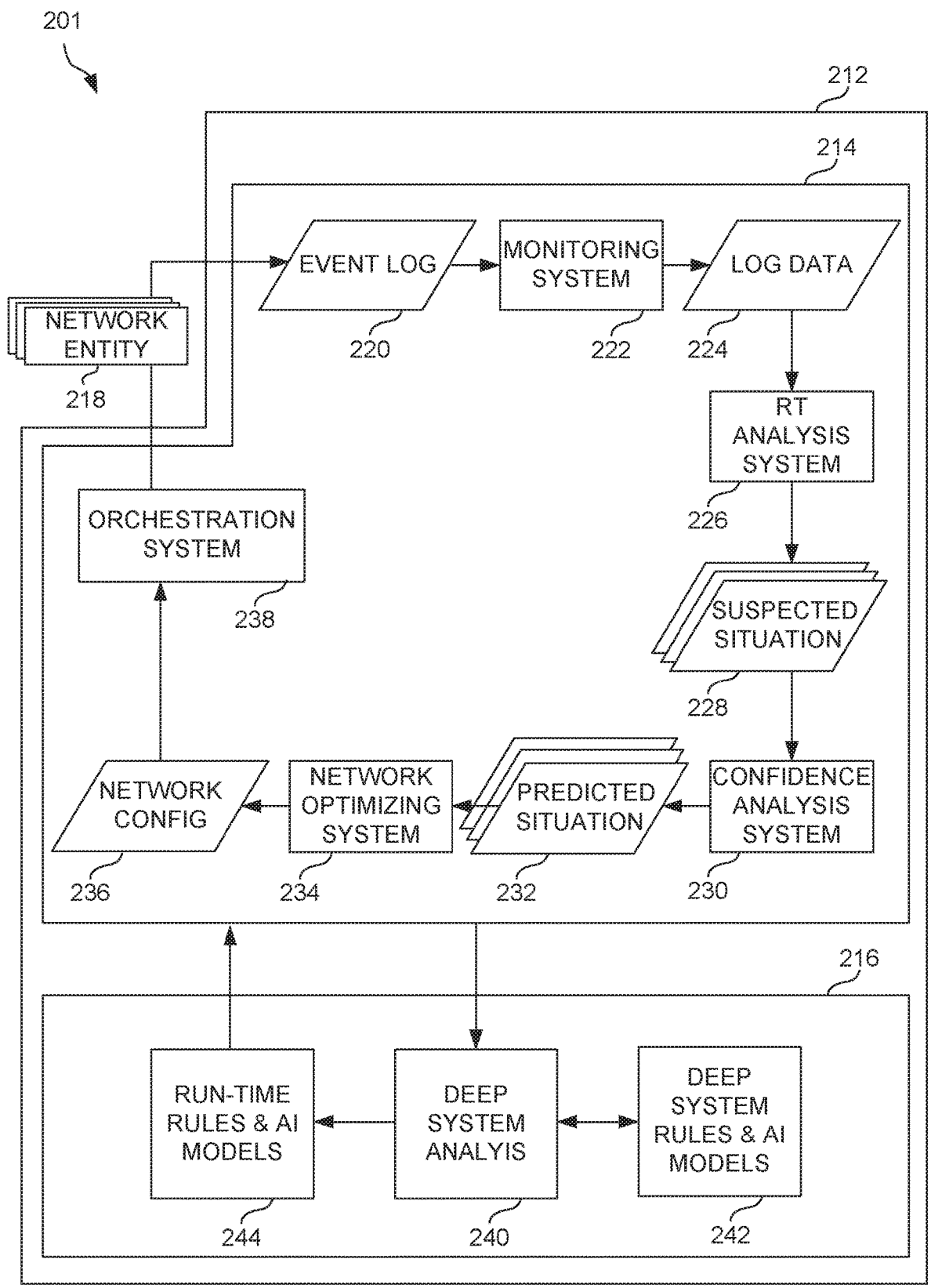
FIG. 2B illustrates a network management system, in accordance with one embodiment.

FIG. 2B illustrates a network management system 201, in accordance with one embodiment. As an option, the network management system 201 may be implemented in the context of any one or more of the embodiments set forth in any previous and/or subsequent figure(s) and/or description thereof. Of course, however, the network management system 201 may be implemented in the context of any desired environment. Further, the aforementioned definitions may equally apply to the description below.

In one embodiment, communication network 202 may include one or more network entities 218 that provide communication services of the communication network 202. For example, the network entities 218 may be arranged in a particular configuration optimized to deliver the communication services (of the communication network 202) according to the one or more SLAs 210. The network management system 212 may determine, implement and manage such optimized configuration of the network entities 218. Additionally, configuration of the network entities 218 may be associated with the deep system module 216, and in particular, the run-time module 214 through use of run time rules and/or AI-models 244, while the deep system module 216 may create, adapt and modify the run-time rules and/or AI-models 244, as well as deep system rules and/or AI models 242 by which the deep system module 216 operates.

In addition, the network management system 212 may include the run-time module 214, which may include an event log, 220, a monitoring system 222, log data 224, a real-time (RT) analysis system 226, one or more suspected situations 228, a confidence analysis system 230, one or more predicted situations 232, a network optimization system 234, network configuration 236, and an orchestration system 238. In one embodiment, the network entities 218, the monitoring system 222, the RT analysis system 226, the confidence analysis system 230, the network optimization system 234, and the orchestration system 238 may function as system components. Similarly, the event log 220, the log data 224, the one or more suspected situations 228, the one or more predicted situations 232, and the network configuration 236 may function as data elements.

The one or more network entities 218 may compute and communicate to the monitoring system 222 the event log 220, typically including values for parameters relating to the performance of the communication network 202 and/or the one or more network entities 218. The monitoring system 222 may then collect the event log 220 (including data records) to create the log data 224. RT-analysis system 226 may then analyze the log data 224 to detect the one or more suspected situations 228. Confidence analysis system 230 may then collect, compare and analyze the one or more suspected situations 228 to determine one or more predicted situations 232. Based on the current predicted situation of the one or more predicted situations 232 the network optimization system 234 may create an optimal network configuration 236. Next, the orchestration system 238 implements the optimal network configuration 236 by reconfiguring the one or more network entities 218.

In one embodiment, deep system module 216 may supervise the operation of the run-time module 214. For example, the run-time module 214 may operate on the basis of run-time rules and/or AI-models 244, which in turn are created and/or managed by the deep system analysis system 240 which operates on the basis of deep-system rules and AI models 242. The deep system analysis system 240 may be a collection of systems, arranged for example in stratified levels with their respective deep-system rules and AI models 242, as explained hereinbelow.

Further, the run-time rules and AI models 244 as well as the deep-system rules and AI models 242, may be created manually, or automatically using respective AI-learning systems operating in the deep system module 216. For example, the deep system module 216 may include any AI learning and/or RT-analysis system (including, for example, AI learning system 510 hereinbelow described). Further, the run time rules and AI models 244 as well as the deep system rules and AI models 242, may be updated, modified and/or adapted manually, or automatically using respective AI-analysis (serving) systems operating in the deep system module 216.

In one embodiment, an entity operating a network may use the network management system 212 and/or the orchestration system to manage one or more network configurations. Additionally, in the context of the present description, the term "configuration change" and/or "reconfiguration" may refer to any type of change in network configuration. In one embodiment, the type of change may include a load-change, network fault, preventive maintenance, cyber-attack, etc. Additionally, a network optimizing system (such as network optimizing system 234) and/or orchestration system (such as orchestration system 238) may analyze load conditions, requirements, and/or changes to determine if a configuration change is necessary, and if so, determine optimal configuration settings, including generating and/or applying a configuration change.

In one embodiment, a configuration change may be analyzed, determined and affected by an AI-based network optimizing system 234 and/or orchestration system 238 using one or more artificial intelligence (AI) engines. Such an AI-engine may use AI rules (e.g., AI-Model(s)), which may be created by an AI-engine using deep learning and/or machine learning technology to analyze training data based on, or sourced from, log-data. For example, the AI-based network optimizing system 234 and/or orchestration system 238 may use AI rules (AI-Models) to analyze load-changes, determine a configuration change, and/or effect an appropriate configuration change.

In the context of the present description, the term "load" may refer to any type of network characteristic, parameter, and/or service. For example, load may include bandwidth, latency, jitter, processing power, memory, storage, etc. Additionally, load may include any requirement (such as used by such network characteristic, parameter, and/or service). Additionally, the term "load-change" may refer to any change in load. For example, load-change may include a change of a load requirement, use, and/or consumption, associated with a network characteristic, parameter, and/or service. In one embodiment, load-change may cause a configuration change. As such, load-change may include other causes for a configuration change, such as a network fault, anticipated network fault (such as requiring preventive maintenance), cyber-attack and/or security breach, etc. Further, load-change may include a change in load (such as a load decrease) that may be used in turn to shut down equipment and reduce operating costs or may include an anticipated load-change which may be used to anticipate the development of a particular load-change.

Additionally, in the context of the present description, the term "log-data" may refer to any record (including a file, repository, and/or database) which may represent an event detected in the network. Such an event may be detected by one or more network nodes or servers, by software executed by such network nodes or servers, by a network management system or software (including, but not limited to, a network orchestration system or software), and/or by a network-monitoring system. Additionally, the log-data may include identification of an event (such as a network event), associated data characterizing the particular event, and/or identification of the current network configuration or topology. As such, log-data may include event-log data as well. In one embodiment, log-data may include a link to a file, repository, and/or database, or may be included within an application programming interface (API) for such file, repository, and/or database. If log-data is communicated, it may be communicated in a computer readable format such as XML.

Further, log-data may be used to train and/or test an AI-engine (including an AI-based network design and/or management system).

In the context of the present description, the term "characterization" may refer to defining any type(s) of network or communication services, facilities, resources, etc. For example, characterization may include defining a network service that is required, including associated computing services, facilities, resources, etc. In one embodiment, characterization may include the term "characteristic".

Moreover, in the context of the present description, the term "current network configuration" and/or "current network topology" may refer to a network configuration and/or topology in use at the time of logging an event and/or at the time of executing a rule. Additionally, the term "configuration representation" may refer to a mechanism that can represent a network configuration. For example, configuration representation may include software (e.g., VNF) deployment, service definitions, respective allocation of network and processing resources (e.g., bandwidth, latency, jitter, etc., processing power, memory, storage, etc.). A configuration representation may enable re-creation of a particular network configuration and/or topology, may enable simulation or emulation of the operation of a particular network configuration and/or topology, and/or may enable identification of a re-occurrence of a particular network configuration and/or topology.

Further, in the context of the present description, the term "network situation" may refer to a condition of the communication network (such as communication network 202) that may require a configuration change, or network reconfiguration. The network situation may be an unwanted situation (such as a failure), or a wanted situation (such as an opportunity to reduce cost, for example, by turning off a network entity). The network situation may be determined for the communication network (or any part of the communication network), for a service (or any part of the service), and/or for a network entity (such as one or more network entities 218), etc.

For example, the network situation may be determined for a particular SLA (such as one of the one or more SLAs 210). A network situation associated with an SLA may represent a situation where the network (or an associated service) does not perform according to the SLA. As such, the characteristics of the network situation may be any collection of parameters representing a fault or an opportunity (e.g., to reduce cost), etc. Such cause for the network situation may be associated with a load, or a load change.

Additionally, the network situation may be associated with a network fault (such as a hardware fault and/or a software fault), anticipated network fault (such as requiring preventive maintenance), cyber-attack, and/or security breach, etc.

In one embodiment, the network management system (such as network management system 212) may be used to detect a developing network situation before it adversely affects the network behavior, or to exploit an opportunity to save cost.

In this respect, in the context of the present description, the term "death expectancy" may refer to a period of time remaining for a particular predicted network situation until it adversely affects a particular service and/or SLA.

In one embodiment, the term or "minimal reconfiguration time", may refer to the minimal period required to reconfigure the network to avoid a respective failure, or to exploit a respective opportunity. For example, to resolve a predicted situation before it adversely affects the particular service and/or SLA. Therefore, the minimal reconfiguration time should be smaller than the death expectancy.

In one embodiment, resolving a particular predicted situation may be delayed until the death expectancy approaches the respective minimal reconfiguration time. Additionally, death expectancy may also refer to a period of time remaining to exploit a particular predicted situation.

Further, the term "life expectancy" may refer to a period of time where the particular network configuration may remain useful before the utility diminishes (and it may then be in need of being replaced with a different network configuration).

Figure 2C:
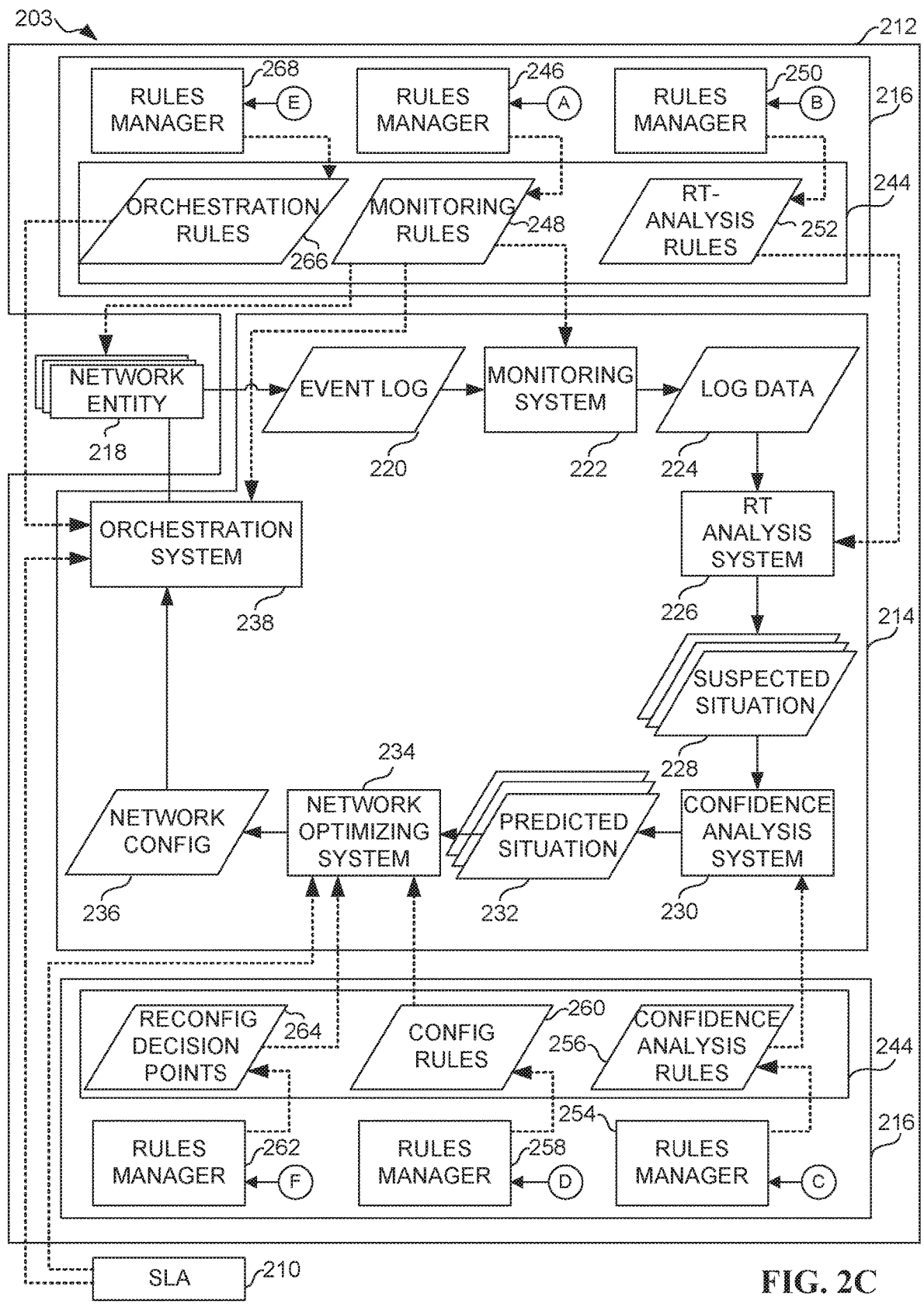
FIG. 2C illustrates a network management system, in accordance with one embodiment.

FIG. 2C illustrates a network management system 203, in accordance with one embodiment. As an option, the network management system 203 may be implemented in the context of any one or more of the embodiments set forth in any previous and/or subsequent figure(s) and/or description thereof. Of course, however, the network management system 203 may be implemented in the context of any desired environment. Further, the aforementioned definitions may equally apply to the description below.

As shown, the network management system 203 includes the network management system 212 which includes run-time module 214 and run-time rules and/or AI-models 244 of deep system module 216.

Run-time rules and/or AI-models 244 may be in communication with various components of the run time module 214, such as: monitoring rules 248 (in communication with monitoring system 222), real time (RT)-analysis rules 252 (in communication with RT analysis system 226) which may be used to analyze the log data 224 and/or to detect the one or more suspected situations 228, confidence analysis rules 256 (in communication with confidence analysis system 230) to analyze the one or more suspected situations 228 and determine the one or more predicted situations 232, configuration rules 260 (in communication with the network optimization system 234 and/or the reconfiguration decision points 264) to analyze the one or more predicted situations 232 and create network configurations 236, reconfiguration decision points 264 (in communication with configuration rules 260 and network optimizing system 234), and orchestration rules 266 (in communication with orchestration system 238) to implement the network configuration 236.

The run-time module 214 may also receive data including from SLAs 210. Of course, any of the monitoring rules 248, RT-analysis rules 252, confidence analysis rules 256, configuration rules 260, reconfiguration decision points 264, and/or orchestration rules 266 may be in communication with any specific element of run-time module 214.

Configuration rules 260 may be used by the Network Configuration 236 to create an optimal network configuration according to a network infrastructure, a current state of the network, available predictions of near-future network behavior, SLAs (or similar requirement definitions), cost considerations, available resources, etc. In one embodiment, cost considerations may include the cost of installing, updating and/or synchronizing a new network entity and/or a new virtual network function, moving data from one new network entity (and/or virtual network function) to another network entity (and/or virtual network function), and/or the cost of specific resource in a specific location, etc.

Reconfiguration decision points 264 may include network situation(s) where a new network configuration may be computed and determined. For example, a reconfiguration decision point may be determined according to a predicted situation, or a combination of predicted situations. Additionally, the network optimizing system may determine a point in time when a new network configuration may be required by applying rules associated with the reconfiguration decision points 264 (which may relate to the predicted situations 232). Additionally, a predicted situation data may contain sufficient information (such that an action can be implemented via the network optimizing system 234) about a near future predicted behavior of particular network entities. Further, the network optimizing system 234 may receive current values and corresponding near-future predictions of value changes for any and all parameters of all the network entities 218.

In the context of the present description, a reconfiguration decision point includes a situation where a new network configuration may be computed and determined. In one embodiment, a reconfiguration point may be determined according to a predicted situation, or a combination of predicted situations.

It is appreciated that each collection of rules such as monitoring rules 248, RT-analysis rules 252, confidence analysis rules 256, configuration rules 260, reconfiguration decision points 264, and orchestration rules 266, may be implemented in the form of a file, a repository, or a database. Additionally, such implementation may include a same entity (e.g., file, repository, etc.) for all rules, or may include a different entity (e.g., file, repository, etc.) for each collection of rules.

Additionally, each collection of rules may apply to one or more systems. For example, monitoring rules 248 may apply to network entities 218, monitoring system 222, and/or orchestration system 238. Monitoring rules 248 may direct each of the network entities 218 how and when to report an event log 220, including specifying parameters and/or values to report, etc. Further, monitoring rules 248 may direct monitoring system 222 how to arrange the log data 224.

Further, each collection of rules may be managed by one or more systems. For example, monitoring rules 248 may be created and/or modified by one or more administrators as well as by monitoring system 222, orchestration system 238, and/or confidence analysis system 230. Therefore each collection of rules may be managed by a rules manager, which may receive inputs via a respective hook and determine the respective rule change. In particular, monitoring rules 248 may receive input from rules manager 246, RT-analysis rules 252 may receive input from rules manager 250, confidence analysis rules 256 may receive input from rules manager 254, configuration rules 260 may receive input from rules manager 258, reconfiguration decision points 264 may receive input from rules manager 262, and/or orchestration rules 266 may receive input from rules manager 268.

In one embodiment, each collection of rules may be formed to enable simple addition, removal, selection, and/or deselection (pruning) of rules. Additionally, a system providing an input to any collection of rules (such as monitoring rules 248, RT-analysis rules 252, confidence analysis rules 256, configuration rules 260, reconfiguration decision points 264, and/or orchestration rules 266) may create a new rule, remove a rule, select/deselect (prune) a rule, and/or modify parameters of a rule.

A rules manager (such as any, some, or all of rules manager 246, 250, 254, 258, 262, and/or 268) may eliminate and/or reduce repetitive, too frequent, and/or possibly conflicting rule changes by implementing hysteresis and/or a dead-time period, a majority vote, weights and priorities, etc. For example, a system creating a rule may have priority and/or preference over any other system with respect to a particular rule. Additionally, the system may be particular to the rule managers 246, 250, 254, 258, 262 and/or 268 to prevent an over-ruling event where a first system runs-over a second (or another) system.

In the context of the present description, the term "parametrization" may refer to defining one or more values, or range(s) of values, for any characteristic of the required network or communication service, facility, resource, etc. In one embodiment, parametrization may include alternative acceptable values, or value ranges, with alternative respective priorities. The term "prioritization" may refer to defining priorities for, or between, the various required network or communication services, facilities, resources, etc., as well as their respective parameters.

Additionally, in the context of the present description, the term "weighting" may refer to defining and/or associating evaluation weights to characteristics and/or parameters for computing at least one value. In one embodiment, weighting may include a weighting factor. Additionally, the at least one value may be used for evaluating a particular proposed network service with a minimum requirement, and/or comparing between alternative proposals.

Monitoring rules 248 may instruct the one or more network entities 218 which parameters (such as parameters of the event log 220) to measure, when to measure each parameter, how to measure the parameter, and how to report any measurement. Additionally, one or more network entities may derive the rules directly from a database associated with the monitoring rules 248, or receive the rules from the monitoring system 222 periodically, or per a preconfigured schedule. In another embodiment, the monitoring rules 248 may instruct the monitoring system 222 how to measure inter-network entity parameters, including parameters involving, correlating, or synchronized between, more than one network entity of the one or more network entities 218. Further, the monitoring rules 248 may instruct the monitoring system 222 how to create, format, arrange, and/or maintain a log-data file (such as log data 224) or a database associated with the log data 224. In this manner, the monitoring rules 248 may be conditional upon network situations, and transform according to such network situations (including a progression of the network situations).

The monitoring rules 248 may additionally guide the orchestration system 238 where to instantiate a monitoring probe. After the monitoring probe is instantiated, the monitoring system 222 may instruct such probe (or a monitoring function, or any other reporting network entity) which parameter (or parameters) to measure and report, a frequency of reporting, and a timing to report, such as when a measured value crosses a particular (or preconfigured) threshold, or characteristics of a particular service follow a particular temporal pattern (such as set time intervals, etc.).

Figure 3:
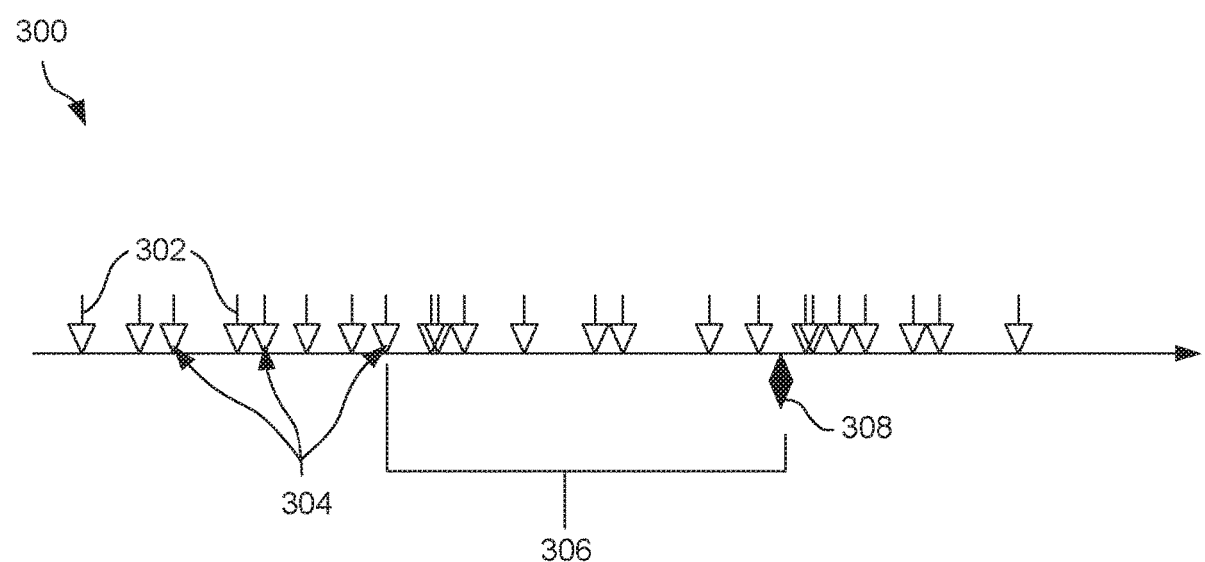
FIG. 3 illustrates an event-log timeline, in accordance with one embodiment.

FIG. 3 illustrates an event-log timeline 300, in accordance with one embodiment. As an option, the event-log timeline 300 may be implemented in the context of any one or more of the embodiments set forth in any previous and/or subsequent figure(s) and/or description thereof. Of course, however, the event-log timeline 300 may be implemented in the context of any desired environment. Further, the aforementioned definitions may equally apply to the description below.

As shown, event-log timeline 300 includes event-log records 302, including log-pattern/classifier 304, and a label for a particular network situation 308.

The log-pattern/classifiers 304 precedes the particular network situation 308 by a time period 306. The time period 306 may be a minimal reconfiguration time. In one embodiment, the time period 306 may be larger or equal to the minimal reconfiguration time. Additionally, the particular pattern of the log-pattern/classifiers 304 may be construed as a classifier for the particular network situation indicated by a label for the particular network situation 308.

Figure 4A:
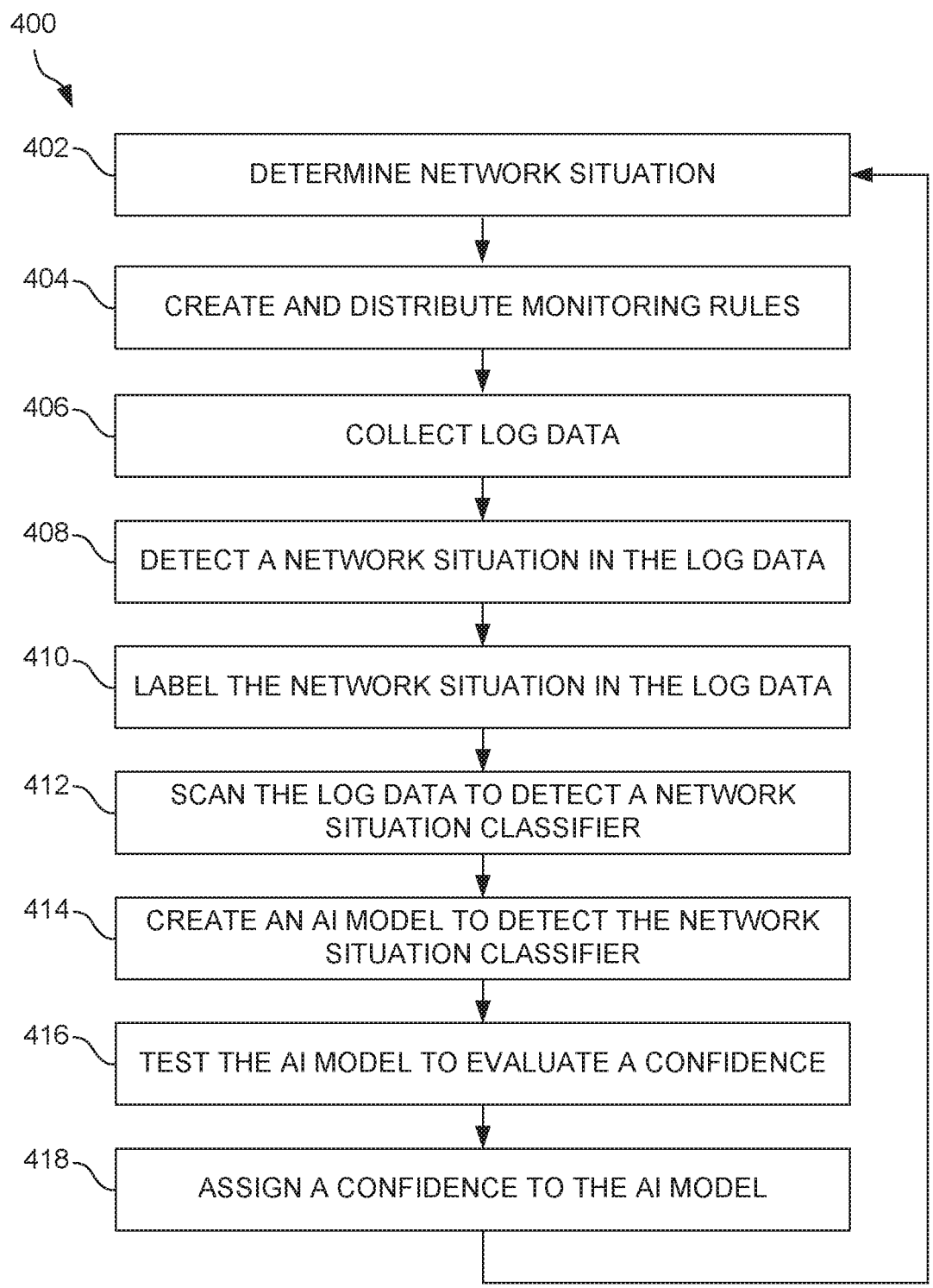
FIG. 4A illustrates a method for processing log data, in accordance with one embodiment.

FIG. 4A illustrates a method 400 for processing log data, in accordance with one embodiment. As an option, the method 400 may be implemented in the context of any one or more of the embodiments set forth in any previous and/or subsequent figure(s) and/or description thereof. Of course, however, the method 400 may be implemented in the context of any desired environment. Further, the aforementioned definitions may equally apply to the description below.

Method 400 shows part of log data (such as the log data 224) processed for creating an AI-model. In one embodiment, the method 400 illustrates a flow chart of a process for creating an AI-model for the RT analysis system 226. As shown, a network situation is determined. See operation 402. In one embodiment, determining the network situation may include also determining particular characteristics of the network situation. For example, a network situation may be an unwanted situation (such as a failure), or a wanted situation (such as an opportunity to reduce cost, for example, by turning off a network entity). A network situation may be determined for a network (or any part of a network), for a service (or any part of a service), for a network entity (such as network entities 218), etc. For example, a network situation associated with an SLA may represent a situation where the network (or an associated service) does not perform according to the SLA. As such, the characteristics of the network situation may be any collection of parameters representing a fault or an opportunity (e.g., to reduce cost), etc. Such cause for the network situation may be associated with a load, or a load change.

At operation 404, monitoring rules may be created and/or distributed. Such monitoring rules may be used to instruct a relevant network entity (of the network entities 218) to measure and report one or more parameters that may be relevant to a network situation(s). Additionally, the monitoring rules may instruct the network entity when to measure each parameter, and how to report any measurement. In one embodiment, a rate of measuring a parameter may be different (such as being more frequent) than a rate of reporting. Further, the reporting may be conditioned by a value measured (or calculated), such as an average value, rate of change of value, etc. Moreover, the monitoring rule may include instructions to locally store unreported measurement(s) for a predetermined span of measurements and/or time.

In another embodiment, a monitoring rule may instruct one or more network entities 218 and/or the monitoring system 222 to report values of parameters and/or characteristics for a particular service in a particular temporal pattern. For example, the event log 220 the or log data 224, may report a timely value of a parameter, or the time in which the value of a parameter crossed a predetermined threshold value, etc.

At operation 406, event-log records are collected, including, log data which may be relevant to the network situation as determined by the characteristics of the network situation.

Additionally, a network situation in the log data is detected in the log data. See operation 408. In one embodiment, the network situation may be detected based on characteristics of the network situation. At operation 410, the network situation in the log data is labeled. Further information relating to the log data and/or the event-log data may be found in FIG. 4.

At operation 412, the log data (such as log data 224) is scanned to detect a network situation classifier. In one embodiment, the log data may include training files used to determine a particular pattern of particular event-log records. Additionally, one or more training files may be created based on such log data. In one embodiment, the network situation classifier may include a particular sequence of parameter value(s) carried by log-data (such as log data 224). Additionally, it may precede and/or predict, a network situation. Further, the particular sequence of parameter value(s) may be specific to a configuration of network entities (such as network entities 218) and services, as well as to the set of monitoring rules (such as monitoring rules 248) executed at that period.

At operation 414, an AI model is created to detect the networks situation classifier. For example, in one embodiment, one or more RT-analysis rules 252 (e.g., a rule-base) may be created for detecting the particular networks situation classifier. In the context of the present description, this rule-base, when created by an AI learning system (such as the RT analysis system 226), may be considered an "AI-model". It is to be appreciated that this network situation classifier and the respective AI-model (i.e., rule-base) may be particular to the network configuration for which the log data (such as log data 224) is collected. In one embodiment, the one or more RT-analysis rules 252 may be implemented as AI models created by an AI learning system (such as RT-analysis rules 252 that may be used by the RT analysis system 226 to detect a classifier in the log data 224).

Additionally, in the context of the present description, the term "particular rule-base" may refer to a rule-base derived from a data-set associated with a particular network configuration and/or topology, or a particular spectrum of network configurations and/or topologies. Further, a particular rule-base, especially in the context of an AI-learning system, may be equivalent to the term "AI-Model". AI-Model may therefore include any collection of rules generated by an AI-learning system, including a deep-learning system and/or a similar entity. The AI-Model may include data relating to a neural-network.

Further, the AI model may be tested to evaluate a confidence level. See operation 416. For example, the AI model may be tested using testing files, including testing files created from log data (such as the log data 224). The AI-model may be tested for a particular network situation classifier. Additionally, a measure of the confidence level may be calculated relating to the detection of a particular network situation classifier (such as an event-log pattern) by the particular AI-model. It is to be appreciated that this networks situation classifier and the respective AI-model may be particular to a specific network configuration for which the log data is collected.

In the context of the present description, the term "confidence level" may refer to any measure of confidence of detecting a classifier, and/or an event-log pattern, that may be associated with a particular suspected situation and/or predicted situation. For example, the confidence level may be measured/calculated according to a percentage of false-positive and/or false-negative detection of the particular classifier, and/or an event-log pattern. The measure of confidence level may represent a probability that, based on a particular suspected situation and/or predicted situation being detected, the particular suspected situation and/or predicted situation will develop. Further, confidence level may be represented simply by "confidence" particularly when associated with a confidence analysis such as a confidence analysis system and/or confidence analysis rules.

At operation 418, a confidence may be assigned to the AI model. For example, the AI-model may be outputted with a specific confidence level to a database associated with the RT-analysis rules 252. In one embodiment, the database may include RT-Analysis Rules 252 and thus may be accessed by the RT analysis system 226. Further, the database may be linked to the RT analysis system 226 and may contain the RT-Analysis Rules 252. After assigning a confidence to the AI model, method 400 may be repeated (starting back at operation 402) for any number of network situations, and/or to amend the confidence of the AI model based on an updated network situation.

In one embodiment, the RT-analysis rules 252 for a particular predicted situation may include a rules-base (such as an AI model) for detecting a sequence of event-log data (such as log data 224) preceding the predicted situation, and/or for reporting current values and corresponding near-future predictions of parameter value(s) changes in relation to any and/or all of the network entities 218 involved.

Figure 4B:
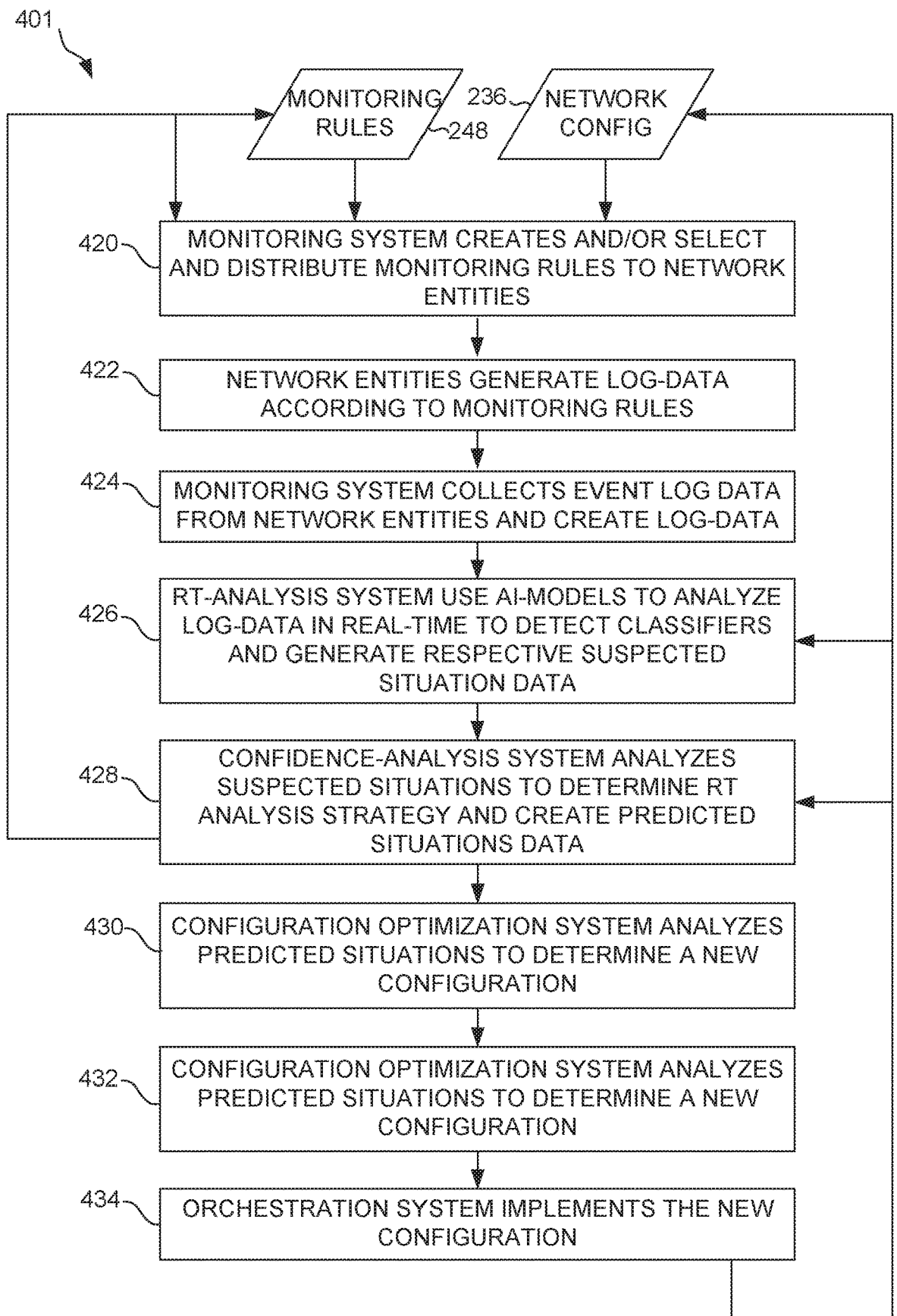
FIG. 4B illustrates a method of a run time process using an AI-model, in accordance with one embodiment.

FIG. 4B illustrates a method 401 of a run time process using an AI-model, in accordance with one embodiment. As an option, the method 401 may be implemented in the context of any one or more of the embodiments set forth in any previous and/or subsequent figure(s) and/or description thereof. Of course, however, the method 401 may be implemented in the context of any desired environment. Further, the aforementioned definitions may equally apply to the description below.

In one embodiment, the method 401 may show a run-time process which may be used by the run-time module 214. In one embodiment, the run-time module 214 may use the method 401 using an AI-model as may be created by the method 400. Additionally, in another embodiment, the method 401 may be executed continuously as a main loop (without a start or end point). Further, the steps of the method 401 may be executed in parallel, or simultaneously, by various systems (such as but not limited to the monitoring system 222, the RT analysis system 226, the confidence analysis system 230, the network optimizing system 234, the orchestration system 238) of the network management system 212.

As shown at operation 420, the monitoring system 222 may create and/or select and distribute the monitoring rules 248 to the network entities 218. In one embodiment, the monitoring rules 248 may be distributed based on a current network configuration. The monitoring system 222 may receive the current network configuration from the orchestration system 238. Further, the monitoring system 222 may continue to create and/or select and distribute the monitoring rules 248 to the network entities 218 as needed.

At operation 422, the network entities 218, using the monitoring rules 248, may generate and send the event log 220 to the monitoring system 222. The network entities 218 may generate and send the event log 220 continuously as needed.

At operation 424, the monitoring system 222 may collect the event log 220 from the network entities 218 and may create the log data 224 (which may be run-time log data). The monitoring system 222 may continue to create the log data 224 continuously.

At operation 426, the RT-Analysis system 226 may use the AI-Models of the RT-Analysis Rules 252 to analyze the log data 224 in real-time to detect the log-pattern/classifiers 304 and generate the respective data for the suspected one or more suspected situations 228. Operation 426 may also be executed continuously, as RT-Analysis system 226 may receive from the monitoring system 222 new log-data 224, detect more log-pattern/classifiers 304, and generate more data for the one or more suspected situations 228. Each of the one or more suspected situations 228 may be associated with a respective confidence level, which may indicate a probability of occurrence of the respective network situation within a particular time period (such as the time period 306).

Additionally, at operation 428, the confidence analysis system 230 may analyze the suspected situations 228 and their respective confidence levels to determine and adapt the RT appropriate analysis strategy. For example, the confidence analysis system 230 may request the monitoring system 222 to create and/or select and distribute the monitoring rules 248 to the network entities 218 to increase the probability of detecting a log-pattern/classifiers 304, and/or to increase the confidence level of a respective suspected situation 228. In one embodiment, the confidence analysis system 230 may generate respective data of the predicted situations 232, such as where a respective confidence level reaches a predetermined threshold. The confidence analysis system 230 may process operation 428 continuously and/or repeatedly as the suspected situation 228 may be further received from the RT-Analysis system 226.

At operation 430, the network optimization system 234 may analyze the predicted situations 232 to determine a new network configuration 236. The network optimization system 234 may process the RT-Analysis system 226 continuously and/or repeatedly as the predicted situations 232 may be further received from the confidence analysis system 230.

Further, at operation 432, the orchestration system 238 may receive from the network optimization system 234 a new network configuration 236 and implement it (at operation 434) by modifying, migrating, installing and/or removing the network entities 218. The orchestration system 238 may process operation 432 continuously and/or repeatedly as the network configuration 236 is further received from the network optimization system 234. As a new network configuration is implemented, the monitoring system 222 may create and/or select and distribute the monitoring rules 248 to the respective network entities 218, and the RT analysis system 226 may select and/or use the respective AI-models included in the RT-Analysis Rules 252.

Additionally, the network optimizing system 234 may determine the network configuration 236 that the orchestration system 238 may then implement to avoid or exploit one or more of the predicted situations 232. Implementing a new network configuration 236 may result in a configuration change or a network reconfiguration. The network optimizing system 234 may determine which of the pending predicted situations 232 should be treated (e.g., avoided or exploited) in the subsequent configuration change.

In one embodiment, the network optimizing system 234 may determine a new network configuration 236 while the orchestration system 238 may still be implementing another (e.g., previously instructed) configuration change (of a previously implement network configuration 236). For example, the network optimizing system 234 may instruct parallel configuration changes affecting different parts of the communication network 202 and/or different network entities 218, and/or different services.

As such, the network optimizing system 234 may consider several parameters that may affect a decision associated with a reconfiguration of the network. Such parameters may include cost, priority, severity, confidence level, death expectancy of the pending predicted situation, life expectancy of a new configuration, collision with another reconfiguration currently processed by the orchestration system 238, etc. In the context of the present description, the term "minimal reconfiguration time" may refer to a minimal time required by an orchestration system (such as orchestration system 238) to migrate one or more network entities (such as network entities 218). In one embodiment, minimal reconfiguraiton time may be associated with a particular service and/or SLA, and, more particularly but not exclusively, with a particular network situation associated with the service and/or SLA.

In one embodiment, a configuration change (such as implemented via the network optimizing system 234 or the orchestration system 238) may be tagged, identified, and/or associated with one or more particular causes and effects and/or result (such as a particular load-change, requirement, fault, cyber-attack, etc.). For example, the network optimizing system 234 and/or orchestration system 238 may tag and/or associate a configuration change with one or more of the causes for a particular configuration change. Additionally, each tag or association may be assigned a weighting factor representing the effect of a particular cause on determining the particular configuration change.

Further, configuration settings may be stored as a data record or a data field in a file or a database (such as a database associated with network optimizing system 234). The data field or data record may include a start and stop time of the respective configuration, and the format of the data field or data record may enable a software package to identify the differences between two (or more) configurations represented by their respective data field or data record.

In the context of the present description, the term "difference measure" may refer to a value representing a difference between two (or more) configurations. Additionally, the term "dislocation" may refer to an entity located in a configuration which differs from the location noted in a reference configuration. A dislocation may refer to a missing entity, an added entity, and/or an entity located in a different place. Such entity may be any hardware component and/or a software component, such as a VNF instance, and/or a service, such as a micro-service.

In various embodiments, training and/or testing data may be derived from the same data-set (including log-data). Additionally, the training data may be used to train the AI-engine to produce a rule-base, and the testing data may be used to evaluate the effectiveness of the developed rule-base.

The network optimization system 234 may determine the network configuration 236 which the orchestration system 238 may then implement to avoid or exploit one or more predicted situations. In one particular situation, implementing a new network configuration may result in a configuration change or a network reconfiguration. As such, the network optimization system 234 may determine which of the pending predicted situations should be treated (e.g., avoided or exploited) during the next configuration change.

Additionally, the network optimization system 234 may determine a new network configuration while orchestration system 238 may still be implementing another (e.g., previously instructed) network configuration 236. For example, network optimization system 234 may instruct parallel configuration changes affecting different parts of communication network 202, network entities 218, and/or different services.

In one embodiment, the network optimization system 234 may consider a variety of parameters which may affect a reconfiguration decision, including but not limited to, cost, priority, severity, confidence level, death expectancy of the pending predicted situation, life expectancy of the new configuration, collision with another reconfiguration currently processed by the orchestration system 238, etc. These parameters may also be considered in the context of processing the reconfiguration decision points 264 by the network optimizing system 234.

Additionally, it is to be appreciated that a configuration or reconfiguration change may directly affect cost. For example, a configuration change may involve migration of a software entity from one hardware entity to another. Such a migration may be executed in the form of "make before break", so as not to disrupt or adversely affect any service. This operation may mean that software entity B is installed, operated and updated in hardware entity B before software entity A is removed from hardware entity A. Therefore, software entity A and software entity B may be operative in parallel, and may each be implemented on a specific hardware entity, thereby increasing cost, including hardware, electricity, maintenance (including dissipating heat from hardware) costs, as well as third party costs including processing, storage, communication, licensing, etc. Furthermore, any additional costs (including extra hardware entities, etc.) may obviously affect the ability to generate income using the particular hardware entity.

Additionally, a configuration or reconfiguration change may be subject to priorities (such as due to limited resources). For example, migrating a first software entity from hardware entity A to hardware entity B may adversely affect the ability to migrate a second software entity to hardware entity A or to hardware entity B, as well as to any other hardware entity depending on a communication facility and/or hardware entity involved in the migration of the first software entity.

In one embodiment, the network optimization system 234 may use at least two sets of rules including configuration rules (which may determine how to resolve one or more predicted situations by an optimal reconfiguration) and reconfiguration decision points 264 (which may additionally determine when to resolve pending predicted situations).

In one embodiment, based on the processing of the reconfiguration decision points 264, the network optimization system 234 may determine which of the pending predicted situations to process for the next network configuration and when to process such pending predicted situations. For example, the network optimization system 234 may determine based on a reconfiguration condition point (of the reconfiguration decision points 264), whether to effect a reconfiguration immediately, or to delay a reconfiguration based on, for example, a combination of long death expectancy and low confidence level. In one embodiment, a reconfiguration may be delayed until a confidence level increases.

Additionally, the deep system module 216 may include processes (e.g., modules, systems) that may create and modify run-time rules. In one embodiment, the deep system module 216 may be construed as a-reverse analysis channel as it may use the output of the run-time module 214 to manage run-time rules. In other words, the deep system module 216 analyzes the behavior of the run-time module 214 so as to improve it by optimizing the rules controlling the behavior of the run-time module 214, such as adaptive pattern recovery and/or behavioral patterns.

Figure 5:
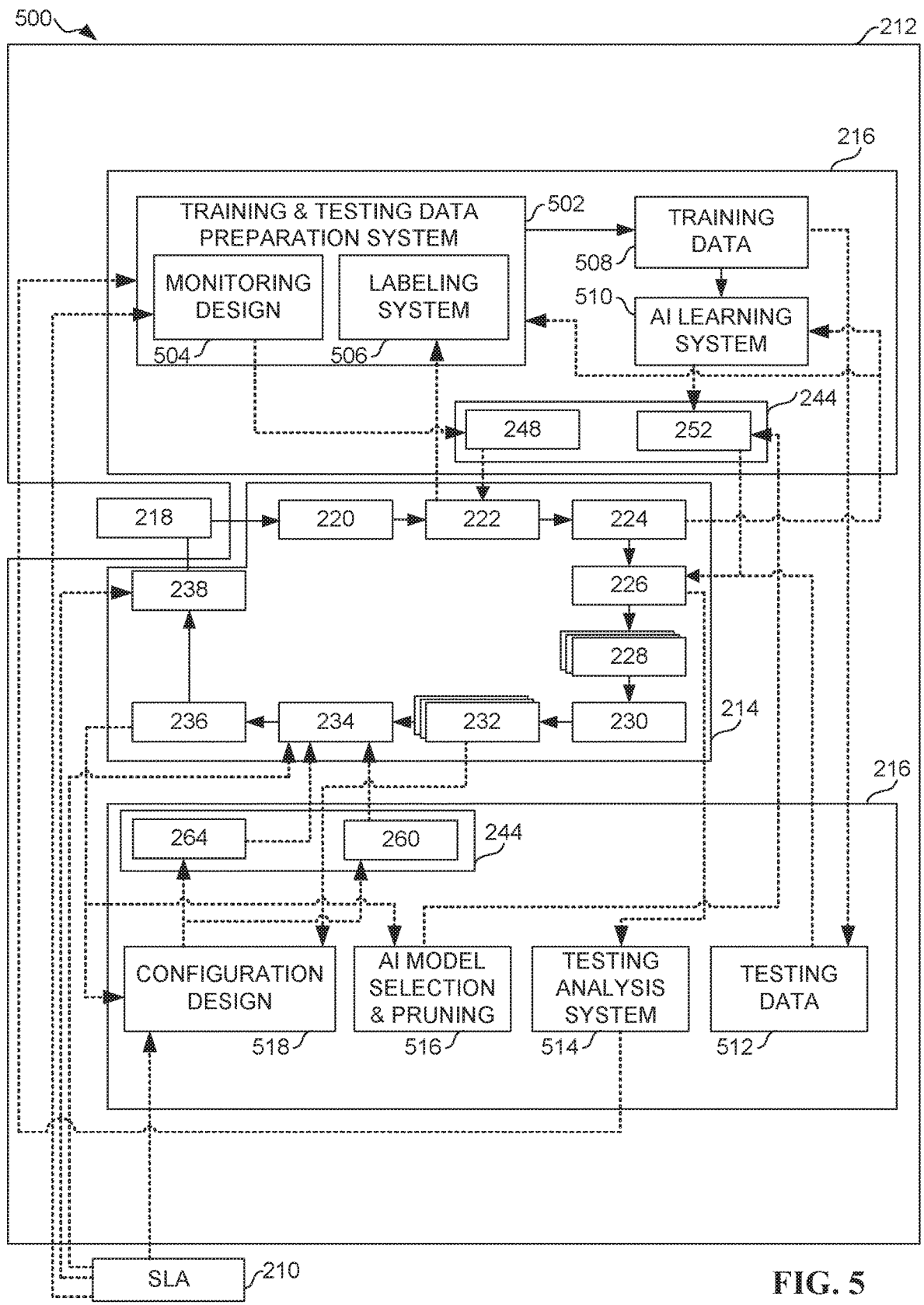
FIG. 5 illustrates a network management system, in accordance with one embodiment.

FIG. 5 illustrates a network management system 500, in accordance with one embodiment. As an option, the network management system 500 may be implemented in the context of any one or more of the embodiments set forth in any previous and/or subsequent figure(s) and/or description thereof. Of course, however, the network management system 500 may be implemented in the context of any desired environment. Further, the aforementioned definitions may equally apply to the description below.

As shown, an AI learning system 510 which may produce the RT-analysis rules 252 (or the AI-models, or predictors). The AI learning system 510 may analyze training data and/or testing data that is created from the log data 224 to produce RT-analysis rules 252. Additionally, the AI learning system 510 may receive as input the log data 224.

Additionally, the training and testing data preparation system 502 may include a monitoring design module 504 and a labeling system 506. Labeling system 506 may convert log-data (such as the log data 224) into training-data and testing-data for the AI learning system 510. The labeling system 506 may label training-data and testing-data. In one embodiment, the labeling system 506 may determine where to properly mark network situations in the training-data and/or testing-data. In one embodiment, the labeling system 506 may receive as input the log-data 224 from the monitoring system 222. In one embodiment, the log-data inputted to the labeling system 506 may be separate from the log data 224. For example, in one embodiment, the monitoring system 222 may provide separate log-data to the labeling system 506. The output of the labeling system 506 includes training data and testing data (based on log-data with labels of network situations). The output of the monitoring design module 504 includes monitoring rules adapted to particular network situations.

In one embodiment, the monitoring design module 504 may create and distribute monitoring rules to one or more relevant network entities such that that network situations and their respective classifiers can be detected. Additionally, a network situation may depend on a network configuration and/or the monitoring rules (such as the monitoring rules 248) which may depend on the network situations and/the network configuration.

Additionally, the monitoring design module 504 may optimize monitoring rules to improve the log-data collected and provided to the training and testing data preparation system 502 such that predicted situations can be predicted more accurately and/or earlier, and to enable detection of more or new predicted situations. The output of the training and testing data preparation system 502 may be provided as training data 508, which in turn, may be sent to the AI learning system 510.

As shown, the configuration design system 518 may optimize configuration rules (such as configuration rules 260 and/or reconfiguration decision points 264) to improve the results of the network configuration system. To that end, the configuration design system 518 may receive inputs from the run-time module, including the network configuration 236 and/or one or more predicted situations 232, as well other network parameters, including SLAs 210. Additionally, the configuration design system 518 may measure the quality of the computed network configuration, including a cost of a reconfiguration, time required to reconfigure the network, a length of time the configuration has lasted, etc. In one embodiment, the configuration design system 518 may include goals for the network reconfiguration.

Additionally, an AI model selection & pruning 516 system may receive the network configuration 236 and based on such, may select and prune network configurations, resulting in RT-analysis rules 252. Further, testing analysis system 514, may receive an output from the RT analysis system, and may provide such data as input to the training and testing data preparation system 502.

Figure 6:
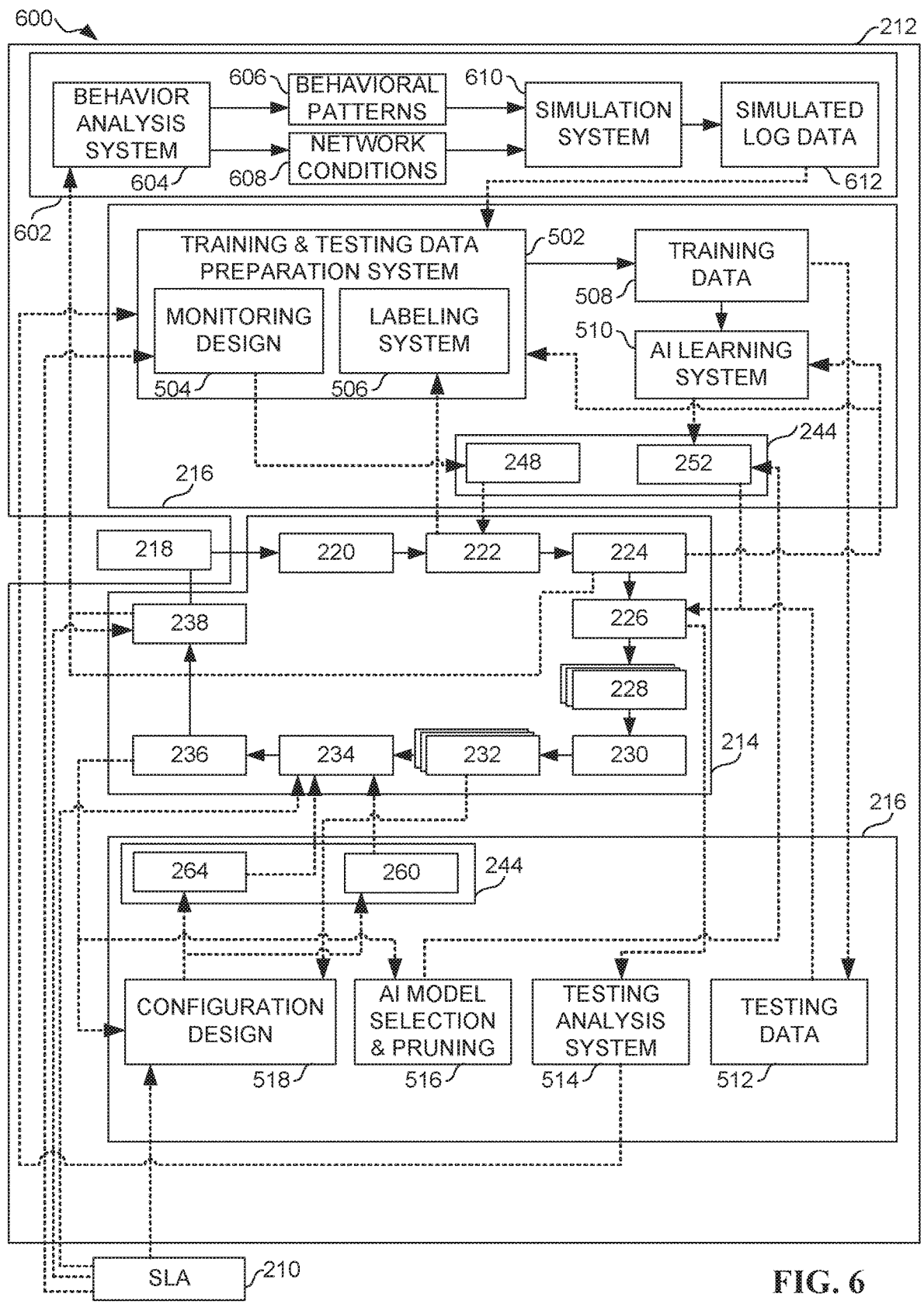
FIG. 6 illustrates a network management system, in accordance with one embodiment.

FIG. 6 illustrates a network management system 600, in accordance with one embodiment. As an option, the network management system 600 may be implemented in the context of any one or more of the embodiments set forth in any previous and/or subsequent figure(s) and/or description thereof. Of course, however, the network management system 600 may be implemented in the context of any desired environment. Further, the aforementioned definitions may equally apply to the description below.

As shown, the network management system 600 builds upon the network management system 500. In one embodiment, the network management system 600 may be used to simulate network behavior when there is no sufficient amount of log-data (which may result from network dynamics, including new network configurations). In such a situation, log-data may be simulated or synthesized. In particular, simulating log-data may include analyze the network behavior to produce primitives that may then be used as components from which training data is composed/synthesized/simulated.

A higher level of the deep system module 216 of the network management system 212 may include processes (e.g., modules, systems) that simulate a network behavior when there is not enough log-data (such as the log data 224). Insufficient log data may result from network dynamics. As demand changes and shifts more rapidly and more frequently, particular network configurations may not produce sufficient log-data. Additionally, network configurations may be new (thereby having no history of log-data). As such, there may be a need to simulate (or synthesize) log-data. The simulation level (corresponding with the simulation module 602) may include a collection of mechanisms that analyze the network behavior to produce "primitives". The primitives in turn may be used as a simulation of training-data and testing-data for a new configuration.

In one embodiment, the simulation module 602 may include a behavior analysis system 604, which may produce several primitives, including behavioral patterns 606 and network conditions 608. In one embodiment, the behavioral patterns may include sequences of event-log data (such as log data 224) produced by a network entity (of the network entities 218), or a particular virtual network function (or a similar entity), that are characteristic of a particular arrangement such as a timing to serve a particular service to a particular customer.

At simulation system 610, log-data may be simulated or synthesized for a particular configuration, including arranging, interlinking, and interleaving, behavioral patterns. As such, the behavioral patterns 606 should be properly detected, defined, and characterized, such that they can be properly selected and combined in the process of simulating, or synthesizing, log-data as shown in simulated log data 612.

Additionally, network conditions 608 include situations that may be predicted by the RT analysis system 226. Additionally, the network conditions 608 may serve as labels for labeling (via the labeling system 506 of the training & testing data preparation system 502) the training data 508 (or testing data) for the AI learning System 510. As such, the network conditions 608 should be properly detected, defined, and characterized, such that they can be automatically detected and properly labeled in old and new simulated (synthesized) log-data, as shown in simulated log data 612. For example, a network condition (of the network conditions 608) may be characterized by one or more network parameter(s), and/or by a condition of one or more of particular type(s), including a network fault, a service fault, an SLA fault, a cyber-attack, a security breach, a cost-reduction opportunity, etc.

Figure 7:
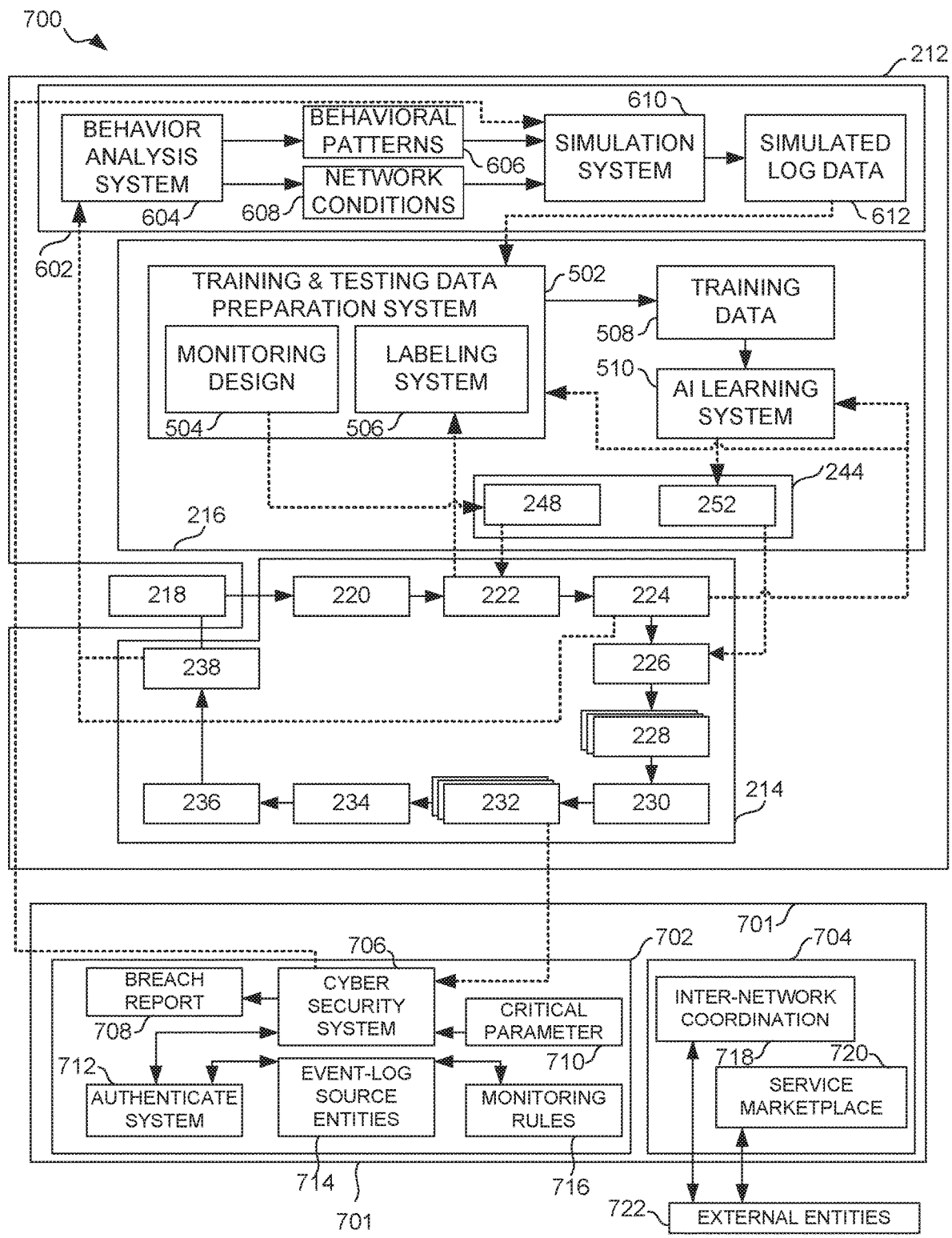
FIG. 7 illustrates a system, in accordance with one embodiment.

FIG. 7 illustrates a system 700, in accordance with one embodiment. As an option, the system 700 may be implemented in the context of any one or more of the embodiments set forth in any previous and/or subsequent figure(s) and/or description thereof. Of course, however, the system 700 may be implemented in the context of any desired environment. Further, the aforementioned definitions may equally apply to the description below.

As shown, a security module 702 and a coordination module 704 may relate to an exogenic level 701. The exogenic level 701 may be separate from the network management system 212, the run-time module 214, and/or the deep system module 216. In one embodiment, the exogenic level 701 may include any aspect foreign to the network management system 212, including but not be limited to interaction with the outside world, other networks, other network management systems, cyber-attacks, and/or any other phenomena that is not intended as internal to the network management system 212.

The system 700 may relate to systems and functions that interact with the environment of the communication network 202. For example, coordination module 704 may include inter-network coordination 718 and service marketplace 720. In one embodiment, inter-network coordination may include coordinating load and configuration matters with neighboring networks, automatically negotiating with other networks and customers, mitigating cyber attacks, etc. Additionally, the inter-network coordination 718 and the service marketplace 720 may communicate with one or more external entities 722. For example, the external entities may include other networks, and/or network systems of customers.

The coordination module 704 therefore may involve computation(s) that depend on the current configuration of the network. In this manner, the coordination module 704 may relate to rules that apply to the current configurations, including current monitoring rules 248, current RT-analysis rules 252, current confidence analysis rules 256, current configuration rules 260, orchestration rules 266, current behavioral patterns 606, etc.

Any such rules of any layer/module/component of the network management system 212 may be exchanged with any external party (such as another network operator, a service provider, and/or a consumer), and/or transmitted to or received from any external party. Additionally, when negotiating network information with a third party (or third parties) any rule may be encrypted and embedded in the negotiation information. In one embodiment, the negotiation information may include the configuration and associated rules that apply to the network condition.

As shown, security module 702 may include a cyber security system 706 which may receive input from critical parameter 710, authenticate system 712, and one or more predicted situations 232. The security module 702 additionally includes an event-log source entities 714 which may be in communication with the monitoring rules 716. In one embodiment, the monitoring rules 716 may include monitoring rules 248. Further, the security module 702 may include a breach report 708 that receives an output from the cyber security system 706. The cyber security system may additionally provide output to the simulation system 610.

In various embodiments, although not shown in FIG. 7, the system 700 may also interact with various components of the network management system 500 and/or the network management system 600. For example, the inter-network coordination may interface with the behavior analysis system 604 and/or the configuration design system 518. In like manner, the service marketplace 720 may interface with the behavior analysis system 604 and/or the configuration design system 518.

Additionally, although the systems which control the network optimizing system 234 are not shown in FIG. 7, it is to be understood that such control systems/aspects are specifically shown in FIG. 5 and/or FIG. 6. Additionally, the training data 508 in FIG. 7 is not shown with an output, as the testing data 512 system is specifically not shown (but which is detailed in relation to FIG. 5 and/or FIG. 6). It is to be appreciated that any omissions of flow of instructions and/or data in FIG. 7 may be supplemented through FIG. 5 and/or FIG. 6. To simplify FIG. 7, aspects of FIG. 5 and/or FIG. 6 were omitted in FIG. 7 to more clearly show the system 700.

Further, data exchanged between systems and/or processes (such as exemplified in FIG. 7 and other figure) may be communicated indirectly, such as by memory, storage, data sharing facility, and/or a database system. A database system may be included within any of the modules, such as any component of the network management system 212. Further, the database system may include network configuration records, network situations associated with their respective network configurations, network situations associated with their respect minimum configuration time values, monitoring rules associated with network situations to which each monitoring rule is applicable, AI-models associated with their respective network situations, confidence levels and/or time periods associated with their respective AI-models and/or network situations, etc.

Figure 8:
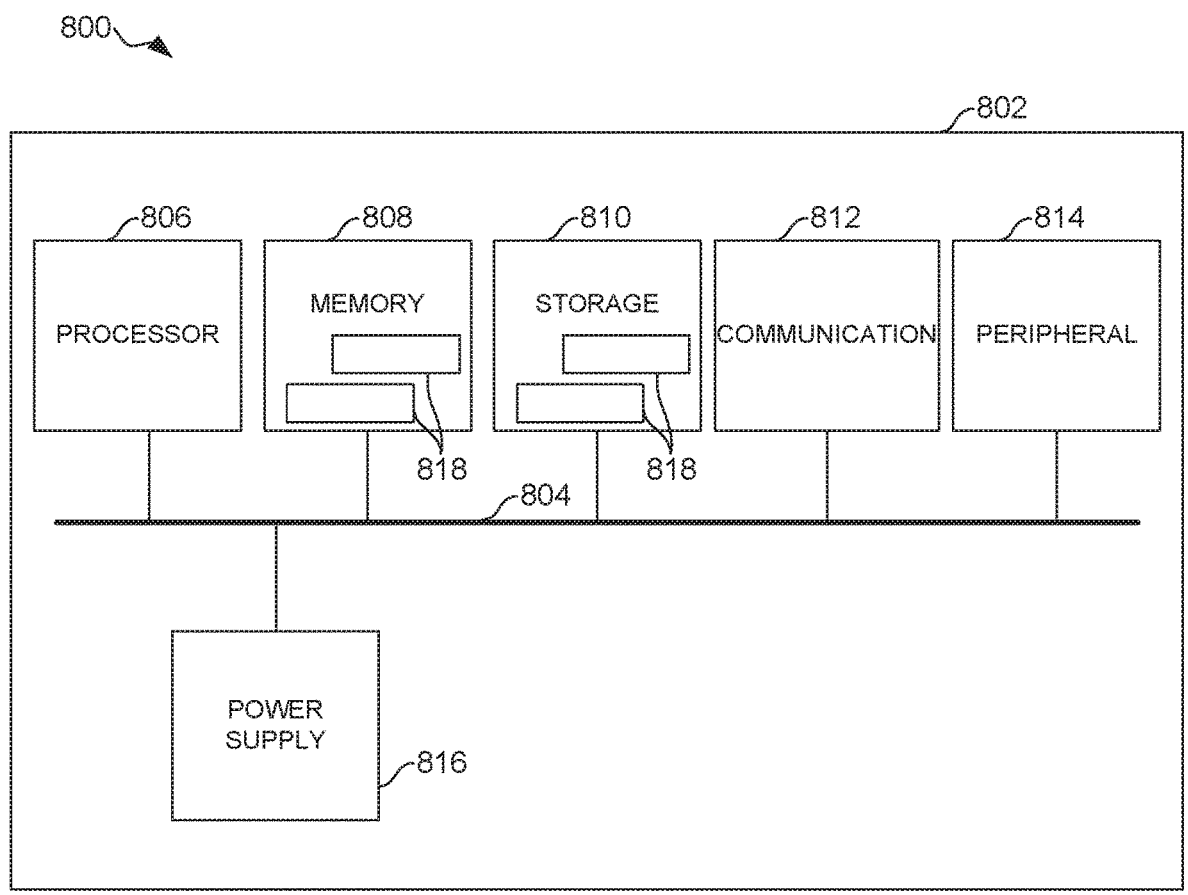
FIG. 8 illustrates a block diagram, in accordance with one embodiment.

FIG. 8 illustrates a block diagram 800, in accordance with one embodiment. As an option, the block diagram 800 may be implemented in the context of any one or more of the embodiments set forth in any previous and/or subsequent figure(s) and/or description thereof. Of course, however, the block diagram 800 may be implemented in the context of any desired environment. Further, the aforementioned definitions may equally apply to the description below.

As shown, block diagram 800 includes a computational device 802 which may be used for a network entity (such as network entities 218) and/or any computing element such as the network management system 212, the deep system module 216, etc., according to one exemplary embodiment. Additionally, the computational device 802 may include at least one processor unit 806, one or more memory units 808 (e.g., random access memory (RAM), a non-volatile memory such as a Flash memory, etc.), one or more storage units 810 (e.g. including a hard disk drive and/or a removable storage drive, representing a floppy disk drive, a magnetic tape drive, a compact disk drive, a flash memory device, etc.), one or more communication units 812, and/or one or more peripheral units 814 (or peripheral control units). The communication unit 812 may use any type of communication technology. Additionally, the computational device 802 may also include one or more communication buses 804 connecting any of the units of the computational device 802.

Further, the computational device 802 may also include one or more power supply units 816 providing power to any of the units of the computational device 802.

The computational device 802 may also include one or more computer programs 818, or computer control logic algorithms, which may be stored in any of the memory units 808 and/or storage units 810. Such computer programs, when executed, may enable the computational device 802 to perform various functions. Additionally, the memory units 808 and/or storage units 810 and/or any other storage may be a tangible computer-readable media.

Figure 9:
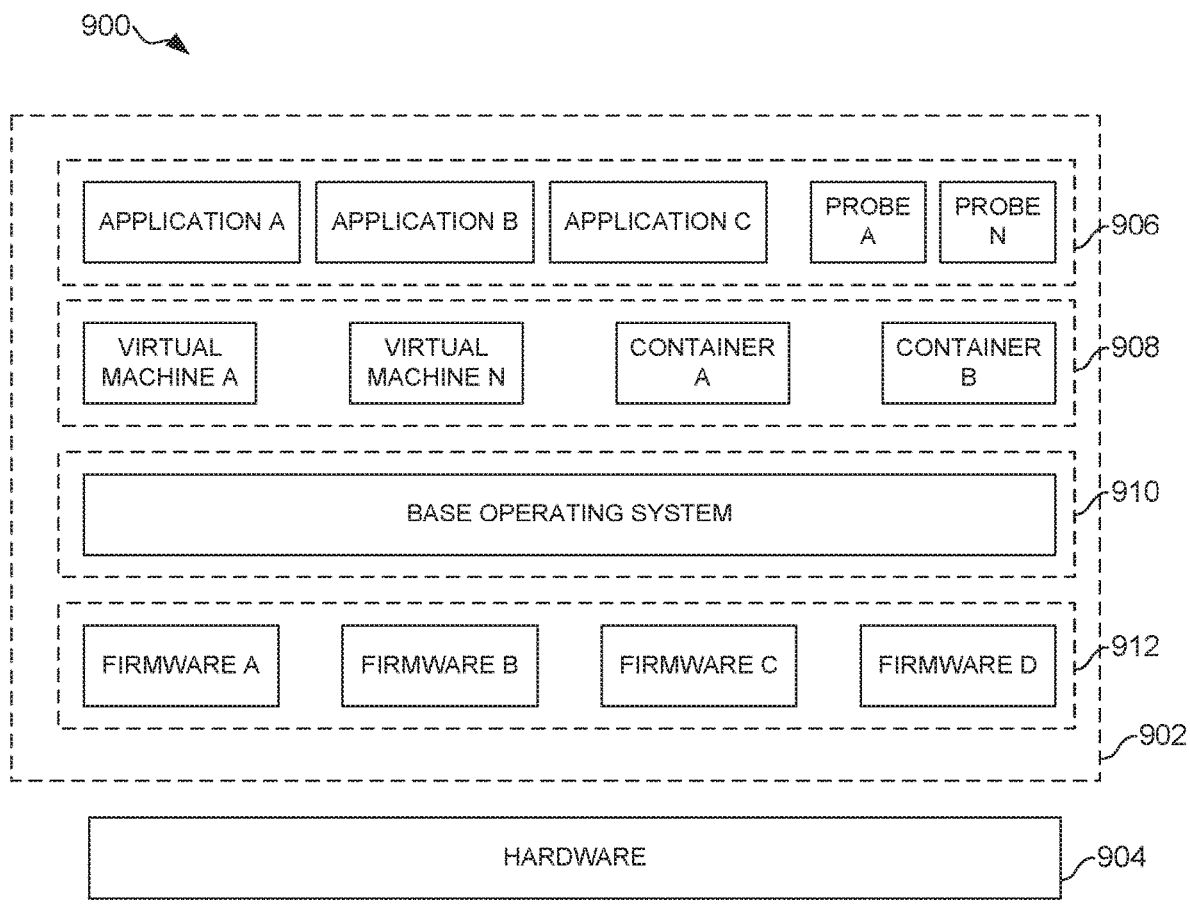
FIG. 9 illustrates a block diagram of software programs, in accordance with one embodiment.

FIG. 9 illustrates a block diagram 900 of a software programs, in accordance with one embodiment. As an option, the block diagram 900 may be implemented in the context of any one or more of the embodiments set forth in any previous and/or subsequent figure(s) and/or description thereof. Of course, however, the block diagram 900 may be implemented in the context of any desired environment. Further, the aforementioned definitions may equally apply to the description below.

In one embodiment, the block diagram 900 may be used by the computational device 802 such as part of the one or more computer programs 818 according to one exemplary embodiment. Additionally, computer programs 818 may operate over hardware 904, which may include hardware components as shown and described with reference to FIG. 8.

The computer programs 902 may include a first level of one or more firmware 912 software programs. The one or more firmware 912 may provide control of one or more hardware components (such as the storage unit 810, communication unit 812, and/or a peripheral unit 814). The computational device 802 may also include a second level of a base operating system 910. The base operating system 910 may provide control of memory units 808 and the hardware 904, typically via firmware 912, as well as communication and coordination between other components.

Additionally, the computer programs 902 may also include a third level 908 of a one or more virtual machines and/or containers. Each virtual machine may include one or more subordinate operating systems, as well as a library of functions. Each container may include subordinate operating systems as well as a library of functions.

The computer programs 902 may also include a fourth level 906 of one or more application software programs and/or probes. An application software program may be any of the software systems as herein described.

In one embodiment, a probe may include a software program that monitors and/or measures (and reports to a monitoring system such as the monitoring system 222) one or more operational parameters of any of the lower levels (such as the third level 908, the base operating system 910, and/or the firmware 912 of a first level), the hardware 904, and/or operational parameters of one or more applications. For example, an application or a probe may be executed over the base operating system 910 directly, over a virtual machine (typically executing a subordinate operating system), or embedded within a container (typically also embedding a subordinate operating system).

In various embodiments, the communication network and network management system of FIG. 2A may orchestrate (and/or manage, control) any component of any level of the computational device 802. Additionally, any component of any level of the computational device 802 may measure one or more operational parameters and report such within the event log 220, typically according to a monitoring rule (such as the monitoring rules 248), to the monitoring system 222. Further, the operations associated with network configuration, configuration change, reconfiguration, and/or migration, may refer to any software component of any level shown of the block diagram 900.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 10:
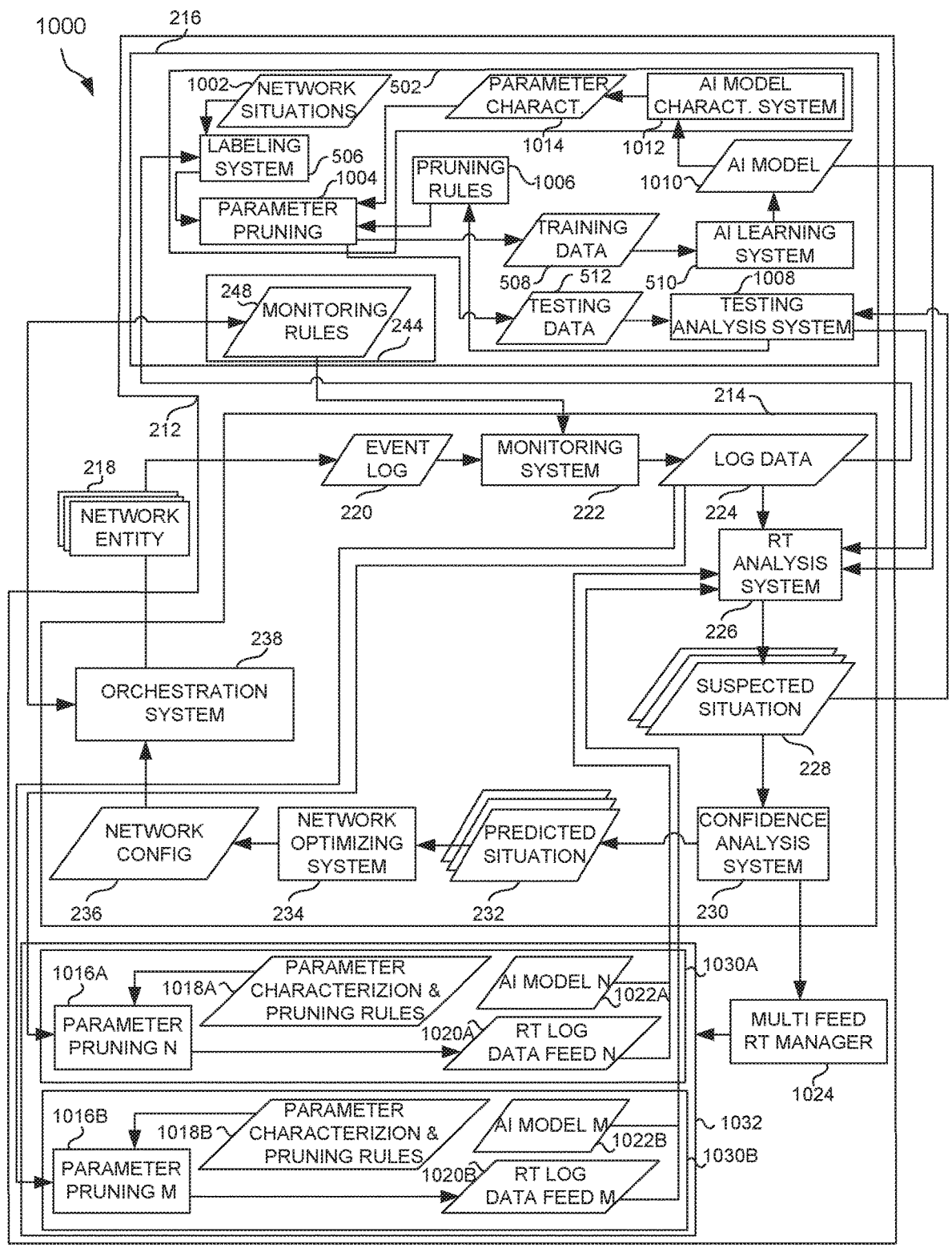
FIG. 10 illustrates a system flow diagram for a multi-feed run-time portion of a network management system, in accordance with one embodiment.

FIG. 10 illustrates a system flow diagram 1000 for a multi-feed run-time portion of a network management system, in accordance with one embodiment. As an option, the system flow diagram 1000 may be implemented in the context of any one or more of the embodiments set forth in any previous and/or subsequent figure(s) and/or description thereof. Of course, however, the system flow diagram 1000 may be implemented in the context of any desired environment. Further, the aforementioned definitions may equally apply to the description below.

In operation, the deep system module 216 may include a multi-feed characterization system and may receive training log data of the log data 224 from the monitoring system 222. Additionally, the system flow diagram 1000 may be part of a network management system, and may include a multi-feed characterization system and a multi-feed run-time system. In one embodiment, the monitoring system 222 may produce training log data of the log data 224 according to monitoring rules 248. The labeling system 506 may label the training log data of the log data 224 with labels indicating respective network situations 1002. A parameter pruning module 1004 may eliminate some parameter data from the log data 224 to produce training data 508 feed as well as testing data 512 feed. The term "parameter data" may include an event-log 220 data record or a part of the event-log 220 data record, or any particular parameter reported in an event-log 220 data record.

The term 'pruning' may mean that the particular data is removed from the particular log data 224 feed, and/or training data 508 feed, and/or testing data 512 feed, provided to the AI Learning System 510. The term 'pruning' may also mean that the particular data is selected from the log data 224 and added to, or distributed in, the log-data feed, and/or the training data 508 feed and/or the testing data 512 feed, provided to the AI Learning System 510.

The AI Learning System 510 may receive the training data 508 feed and produce an AI-model 1010 that may detect a classifier preceding a label of the network situation 1002.

In one embodiment, the parameter pruning module 1004 may also be the same as pruning module 1016A/1016B.

Additionally, an AI model characterization system 1012 may analyze the AI model 1010 and identify parameters processed by the particular AI model 1010, wherein the parameter characterization record 1014 may include identification of the network entity 218 generating the particular parameter and the parameter type. It should be noted that the AI model characterization system 1012 may produce a plurality of parameter characterization records 1014 associated with the particular AI model 1010 associated with a respective network situation 1002 for which the particular AI model 1010 is configured to detect a classifier.

In one embodiment, the AI model 1010 may include one or more of the following parameters: a time of the first classifier, an identification of a particular network situation 1002 that follows the first classifier, a lead-time, a time range, a confidence level, and/or a parameter characterization.

In one embodiment, the parameter characterization records 1014 may be a data record that identifies specific parameter types in the first log data, and one or more network entities that reported the specific parameter types.

In parallel, a testing analysis system 1008 may transmit the testing data 512 to the RT analysis system 226 that may scan the testing data 512. In one embodiment, the RT analysis system 226 may use the AI-model 1010 in scanning the testing data 512. When the RT analysis system 226 detects a classifier preceding a label of the respective network situation 1002 the RT analysis system 226 may produce a suspected situation 228 record (or a predicted situation record), which may typically indicate the detected network situation 1002. In one embodiment, the network situation 1002 may be detected as defined by a service level agreement (SLA) 210.

Furthermore, the RT analysis system 226 serving the testing analysis system 1008 may be an independent process (e.g., server, task, etc.) separate from the RT analysis system 226. In one embodiment, the RT analysis system 226 may analyze the log data 224 stream (which may be a real time log data stream) produced by the monitoring system 222. Additionally, an output of the RT Analysis system 226 process serving the testing system 1008 may be provided to the testing system 1008 (as a suspected situation 228). Additionally, an output of the RT analysis system 226 that analyzes the log data 224 stream produced by the monitoring system 222 may be typically provided to the confidence analysis system 230. In one embodiment, there may be separate data feeds from the AI-model 1010 and run-time (RT) log data feed 1020A/1020B to the RT analysis system 226.

In another embodiment, the process (analyzing the log data 224 stream, using an output of the RT Analysis system 226, etc.) may be repeated with a plurality of labels of a particular network situation 1002, and the testing analysis system 1008 may compute a probability that the particular AI-model 1010 can detect the particular network situation 1002. The testing analysis system 1008 may instruct the parameter pruning module 1004 to prune further parameters from the log data 224 feed using pruning rules 1006.

The process of pruning parameters based on the pruning rules 1006, producing a new AI-model 1010, testing the AI model 1010, and determining a respective confidence level may be repeated by pruning more parameters until the confidence level reaches an optimum. The optimum may be a maxima, or a predetermined level. For example. when the confidence level declines to a predetermined level. For example. when the confidence level increases and then decreases to a predetermined level, or percentage of the maxima.

In one embodiment, the run-time module 212 may include a multi-feed run-time system and may receive a plurality of run-time or real-time log data feeds 1020A/1020B from the log data 224 from the monitoring system 222. Each of the RT log data feed 1020A/1020B may be adapted to a particular AI-module by a respective instantiation of parameter pruning module 1016A/1016B (designated by "N" or "M") configured by respective sets of parameter characterizing rules and pruning rules 1018A/1018B to prune data from the run time log data of the log data 224 to create the respective RT log data feed N 1020A and/or RT log data feed M 1020B.

Furthermore, each instance of the RT analysis system 226 may use a respective AI-model 1010 to process the respective RT log data feed N 1020A and/or the RT log data feed M 1020B to produce a suspected situation 228 record with a corresponding confidence level.

During operation, the suspected situation 228 records may be received by the confidence analysis system 230, and based on the parameters collected (such as identifiers associated with the network situation 1002, respective confidence level, respective severity, respective minimum configuration time, respective lead-time, etc.) a multi-feed run-time manager module 1024 may instantiate, remove, or modify an instantiation of the RT analysis system 226 and its respective pruning module (such as the parameter pruning N 1016A and/or the parameter pruning M 1016B), the parameter characterizing rules and pruning rules 1018A/1018B and the AI-model N 1022A and/or the AI-model M 1022B. In one embodiment, the multi-feed RT manager module 1024 may supervise the multi-feed run-time system 1032 which may include the multi feed modules 1030A/1030B.

It should be noted that for each the multi-feed modules 1030A/1030B, the parameter pruning N 1016A and/or the parameter pruning M 1016B, the parameter characterizing rules and pruning rules 1018A/1018B, the RT AI analysis system 226 and the AI-model N 1022A and/or the AI-model M 1022B may operate with a separate and/or independent level of resolution of the RT log data feed N 1020A and the RT log data feed M 1020B.

In this respect, the SLA 210 or any similar descriptions of wanted and/or unwanted network behavior (e.g., cost saving, service fault, cyber-security attack/breech, etc.) may be used to define a corresponding one or more parametrized network situations (such as the network situations 1002). The network situation 1002 may be parametrized in the sense that it can be detected when the value of one or more operational parameters of the network reaches a particular threshold, etc.

The monitoring rules 248 may be devised and implemented in sufficient network entities 218 to report the pertinent parameters identifying the respective network situation 1002. The network situation may be detected in the log data 224 of the communication network and properly labeled. The AI-learning system 510 may be used to detect a classifier (such as a log-pattern, or a pattern of event parameters reported by various network entities 218, where the log-pattern predicts a following network situation). In one embodiment, the AI-learning system 510 may operate in two steps where an unsupervised AI learning may search for a classifier and the AI-learning system 510 may then create an AI-model 244 to automatically detect a particular single classifier instance.

In a first step, an unsupervised AI learning may search for a classifier, such as a correlated repetition of patterns in the log data 224 preceding the network situation 1002 within a particular time range, wherein the time range may be statistically significant. Additionally, this may include a statistical process where the AI-learning system 510 may investigate a large number of instances of a particular type of network situation (as labeled) to identify a repetitive pattern of the log data 224 (which may be found immediately preceding the network situation within a particular time range), which may be identified as lead-time. It should be noted that there may be any number of different patterns of the log data 224 preceding a network situation type. In this sense, 'immediately' may mean within a predefined time range.

In a second step, the AI-learning system 510 may create an AI-model (such as the run-time rules and/or AI models 244) to automatically detect a particular single classifier instance wherein the classifier (or the associated network situation) may have a confidence level representing the probability that the detected classifier will indeed mature into a network situation within a time range about the lead-time.

It should be further noted that these two steps may be implemented as a single procedure performing these two steps as a combined iterative process of detecting the classifier and creating the AI-model.

In one embodiment, the product of the AI-learning system 510 may be an AI model that detects a particular classifier. Further, the classifier may be a pattern of data elements, and the AI-model is a piece of software (e.g., a neural network) that detects the particular pattern in a stream of log data, so that, although the classifier and the AI-model may be different, they may also be closely related. Thus, parameters associated with the classifier may be associated with the AI-model and vice versa.

In one embodiment, the classifier, and hence the respective AI-model, may include such parameters as the time of the classifier, an identification of a particular type of network situation that may follow the classifier, a lead-time, and possibly a time range, a confidence level, and parameter characterization. In the context of the present description, the term confidence level may refer to the probability that the identified network situation will mature within a predetermined time range. In one embodiment, the predetermined time range may be at the end of the lead-time following the time of the classifier. Other parameters may include parameters associated with a group of classifiers and/or AI-models, such as a resolution stage (level) and minimum reconfiguration time, which may be associated with the network situation, etc.

Although the classifier itself may be unknown, the AI-learning system 510 may provide some data about the classifier, such as the parameters that the AI-model may process to detect an identifier. Additionally, these parameters may form the parameter characterization 1014 data and, thus, the parameter characterization data 1014 of a particular AI-model 1010 may identify each such parameter by type, as well as the particular network entities reporting the particular parameter.

In one embodiment, while the AI-learning system 510 may scan for a lower resolution classifier, the AI-learning system 510 may be requested to look for a classifier with a lead-time longer than any higher resolution classifier. In another embodiment, while the AI-learning system 510 scans for a higher resolution classifier, the learning system may be requested to look for a classifier with higher confidence level than any lower resolution classifier. Therefore, the AI-learning system 510 may produce a multi-stage structure of AI-models 1010 with increasing resolution, increasing confidence level, and decreasing lead-time (and vice versa).

In one embodiment, when the RT analysis system 226 detects a lower-resolution classifier, there may be a higher-resolution classifier associated with a higher confidence level and sufficient lead-time. Additionally, if the higher resolution AI-model 1010 detects a respective classifier, the respective classifier may have a lead time longer than the minimum reconfiguration time for the particular network situation 1002 in the particular configuration.

In another embodiment, for a particular type of network situation 1002, there may be a multi-stage structure of stratified resolutions, where in each resolution level/stage, there may be any number of AI-models/classifiers (to be processed in parallel). Each of the AI-models 1010 may have a respective lead-time and confidence level wherein a lower resolution version of the AI-model 1010 may have lower confidence level (to ensure low probability of false negative detection) and longer lead-time (to enable operating the higher resolution version of the AI-model 1010 in time).

In one embodiment, each network situation 1002 may have its own multi-stage resolution structure having a plurality of levels of resolution. Additionally, each resolution level may have one or more AI-models 1010 and one or more monitoring rules 248 to produce the log data 224 that the respective AI-model 1010 may process to identify the respective classifiers to predict the network situation 1002 with a respective level of confidence (probability of occurrence within a respective time range).

Further, if the AI-model 1010 of a particular resolution detects a classifier and/or the network situation 1002 with a respective confidence level, the system may move to a higher resolution by shutting down all the AI-models 1010 of the current lower-resolution stage and initiating all AI-models 1010 of the next higher resolution stage after the monitoring rules 248 of the higher resolution stage have been operated.

Each AI-model 1010 for a particular network situation 1002, for a particular resolution level/stage, may include a respective parameter characterization 1014, identifying the parameters of the log data 224 investigated by the particular AI-model 1010.

Finally, in one embodiment, the multi-feed system may generate a special, separate, the RT log data feed N 1020A and/or the RT log data feed M 1020B for the particular AI-model 1010 instance being currently operative at the RT analysis system 226, wherein the RT log data feed N 1020A and/or the RT log data feed M 1020B include only the parameters of the log data that are characteristic (investigated by) the particular AI-model 1010.

Figure 11:
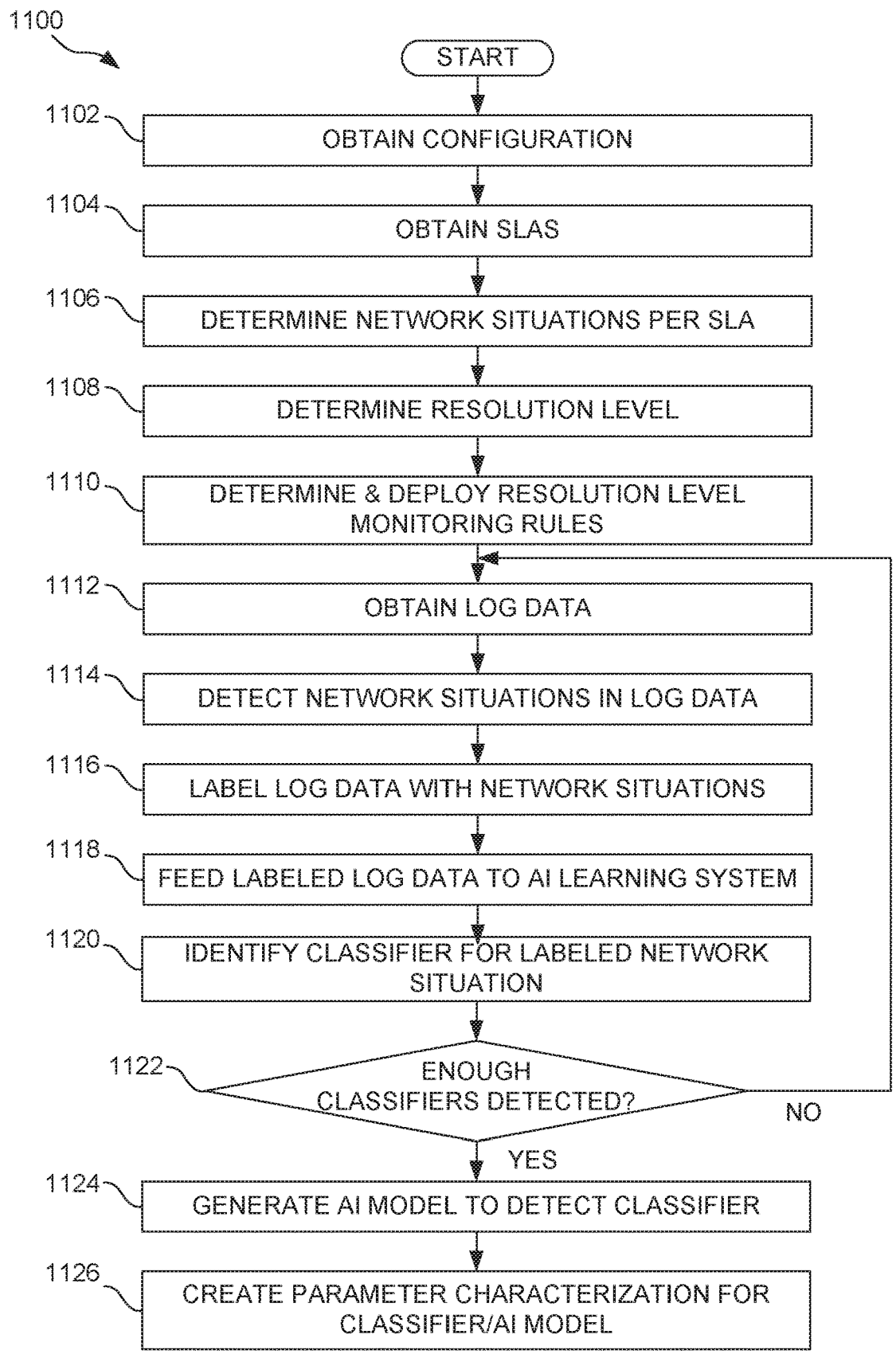
FIG. 11 illustrates a method for multi-feed characterization, in accordance with one embodiment.

FIG. 11 illustrates a method 1100 for multi-feed characterization, in accordance with one embodiment. As an option, the method 1100 may be implemented in the context of any one or more of the embodiments set forth in any previous and/or subsequent figure(s) and/or description thereof. Of course, however, the method 1100 may be implemented in the context of any desired environment. Further, the aforementioned definitions may equally apply to the description below.

In operation, the multi-feed characterization method 1100 may start with step 1102 by obtaining a description of a network configuration, such as a current network configuration. Additionally, the multi-feed characterization method 1100 may obtain SLA records (see operation 1104), or similar service description records, and analyze the configuration and the respective SLAs 210 to determine one or more network situations 1002 (see operation 1106).

Additionally, the multi-feed characterization method 1100 may determine a level of the resolution of the log data (see operation 1108) and determine and deploy in the respective network entities 218 the monitoring rules 248 that are compatible with the selected resolution (see operation 1110).

Further, the multi-feed characterization method 1100 may obtain log data from the monitoring system 222, per operation 1112. In one embodiment, the log data may be collected from network entities according to the deployed monitoring rules 248.

In addition, the multi-feed characterization method 1100 may then proceed to operation 1114 to scan the log data and detect various network situations 1002 in the log data 224, label the detected network situations 1002 of the log data 224 (see operation 1116), and feed the log data 224 labeled with the labels of the detected network situations 1002 to the AI learning system 510 (see operation 1118).

Furthermore, the multi-feed characterization method 1100 may use the AI learning system 510 to detect classifiers in the labeled log data 224 (see operation 1120). It is then determined whether enough classifiers of a particular type are detected in the log data 224. See decision 1122). If there is insufficient classifiers detected, the method 1100 returns to operation 1112, whereas if enough classifiers are detected, the method 1100 proceeds to operation 1124 where one or more AI-models are generated, where each AI-model 1010 is capable of detecting a particular type of classifier. By way of non-limiting example, an adequate amount of classifiers may be detected when the confidence level of the AI-model 1010 reaches a predefined criterion.

Finally, the multi-feed characterization method 1100 may proceed to analyze the AI-model 1010 and determine the parameter characterization for the AI-model 1010. See operation 1126. It should be noted that the parameter characterization may be a data record associated with the AI-model 1010 that identifies the parameter types the particular AI-model 1010 may investigate in the log data 224, as well as the network entities 218 that reported the particular parameter types.

In one embodiment, the characterization process may continue until all network situations 1002 are detected, labeled, scanned for classifiers, the respective AI-models 1010 are created with their respective parameter characterization, and/or the log data 224 is exhausted. Additionally, when the multi-feed characterization method 1100 has created a plurality of AI-models 1010 with their respective parameter characterization, a pruning characterization stage may begin, as described in FIG. 12.

Figure 12:
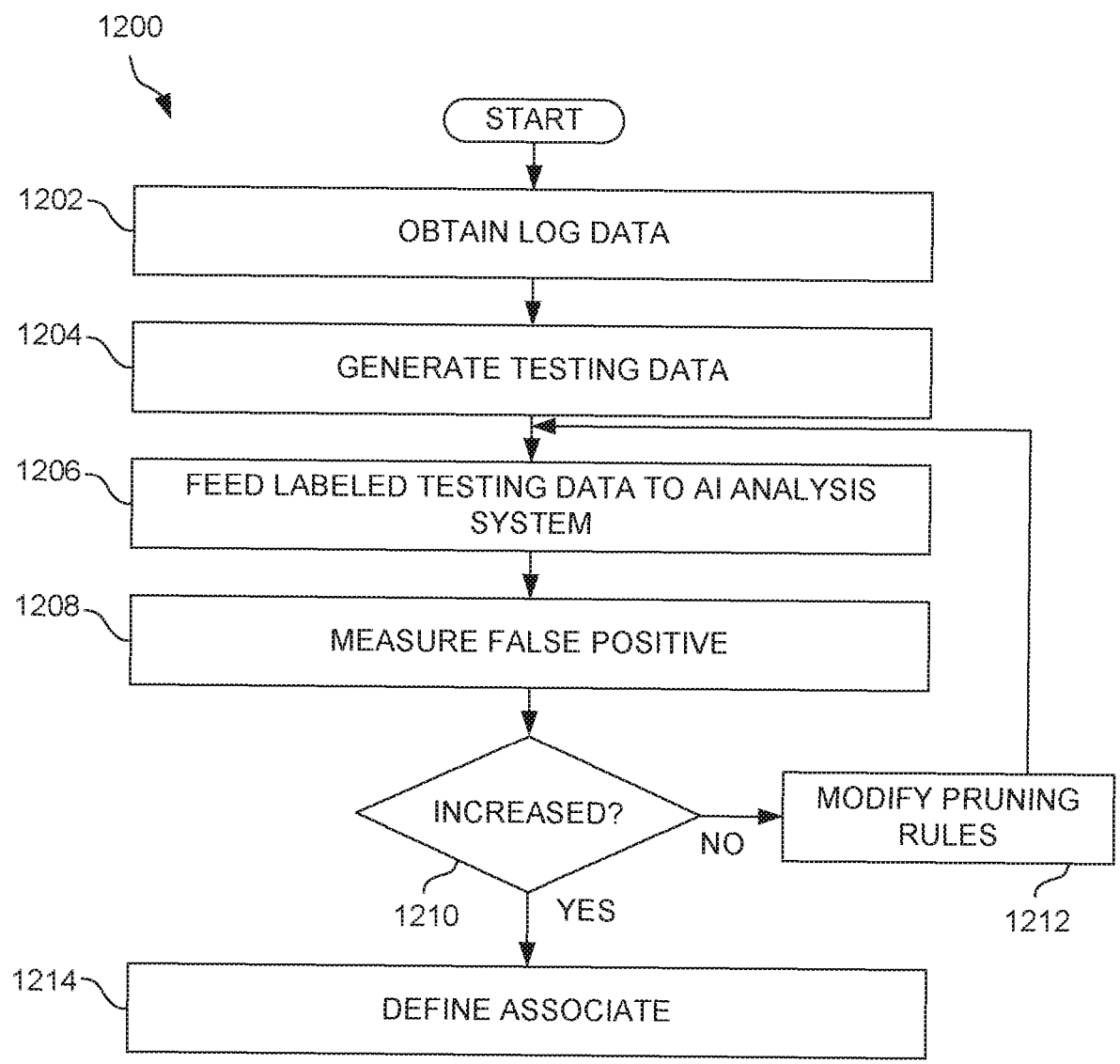
FIG. 12 illustrates a method for pruning in a multi-feed characterization system, in accordance with one embodiment.

FIG. 12 illustrates a method 1200 for pruning in a multi-feed characterization system, in accordance with one embodiment. As an option, the method 1200 may be implemented in the context of any one or more of the embodiments set forth in any previous and/or subsequent figure(s) and/or description thereof. Of course, however, the method 1200 may be implemented in the context of any desired environment. Further, the aforementioned definitions may equally apply to the description below.

It is appreciated that, in this respect, the term 'pruning', and/or 'parameter pruning', and/or 'pruning rules', may refer to removing, such as removing one or more parameters from log-data bound to a particular AI-model, or selecting, adding, forwarding, and/or distributing, such as selecting one or more parameters for, and/or adding one or more parameters to, log-data forwarded and/or distributed to a particular AI-model.

In operation, the method 1200 may begin, per operation 1202, by obtaining log data (which may be compatible with the log data of operation 1112, and which include the same configuration, SLAs, resolution level, monitoring rules 248, and network situations 1002). Additionally, the characterization subsystem may generate testing data in a manner as described in relation to operations 1114 and 1116 (see operation 1204). It should be noted that the method 1200 may also use the log data 224 produced by, as an example, operations 1112, 1114, and 1116, wherein the testing data 512 may be prepared for a particular AI-model 1010 (e.g., the log data may be labeled for a corresponding network situation).

Additionally, the method 1200 may feed the labeled testing data 512 to the RT analysis system 226 (see operation 1206) using the respective AI-model 1010 produced in operation 1124. Thereafter, the RT analysis system 226 may report the classifiers and/or their respective network situations 1002 that the AI-model 1010 has detected in the testing data 512, and may record the respective time in the log data 224 where the respective classifier has been detected.

In addition, the number of classifiers (e.g., network situations 1002) detected by the RT analysis system 226 may again be recorded, and the process may repeat. For example, per operation 1208, the false negative may be measured, and per decision 1210, it is determined whether the false negative have increased. In one embodiment, the RT analysis system 226 (e.g., implementing the AI-model 1010) begins to skip over classifiers such that the false positive count increases.

In this respect the term 'false negative' may refer to a situation where the searched item, namely the classifier, exists but is not detected, and therefore the negative result is false. It is appreciated that the for low resolution classifiers and/or AI-models the system may prefer low probability of false negative results (misses) for the price of relatively high probability of false positive results (a classifier is falsely detected though it does not exist and therefore the network situation will not mature during the predicted period). It is appreciated that the for low resolution classifiers and/or AI-models the system may prefer relatively higher probability of false negative results to achieve relatively low probability of false positive results.

Further, the method 1200 then may continue to operation 1212 to create and/or modify pruning rules for the AI-model 1010, where a set of associated pruning rules may eliminate logged parameters from the log data 224, including the pruning rules eliminating parameters not listed in the parameter characterization of the particular AI-model 1010. In one embodiment, the action of pruning rules may reduce testing log data that is provided to the RT analysis system 226 using the same AI-model 1010. As noted above, the term 'pruning' here may mean selecting parameters and adding them to a log-data stream bound to a respective AI-model.

Furthermore, the method 1200 may finalize the definition and association of the AI-model 1010, respective configuration, network situation 1002, resolution level, and monitoring rules 248, as well as parameter characterization, pruning rules, and confidence level (see operation 1214).

It is appreciated that the processes of FIG. 11 and 1200 of FIG. 12 may be repeated and/or iterated to achieve optimal AI-model and pruning rules for any particular network situation and/or respective classifier.

Figure 13:
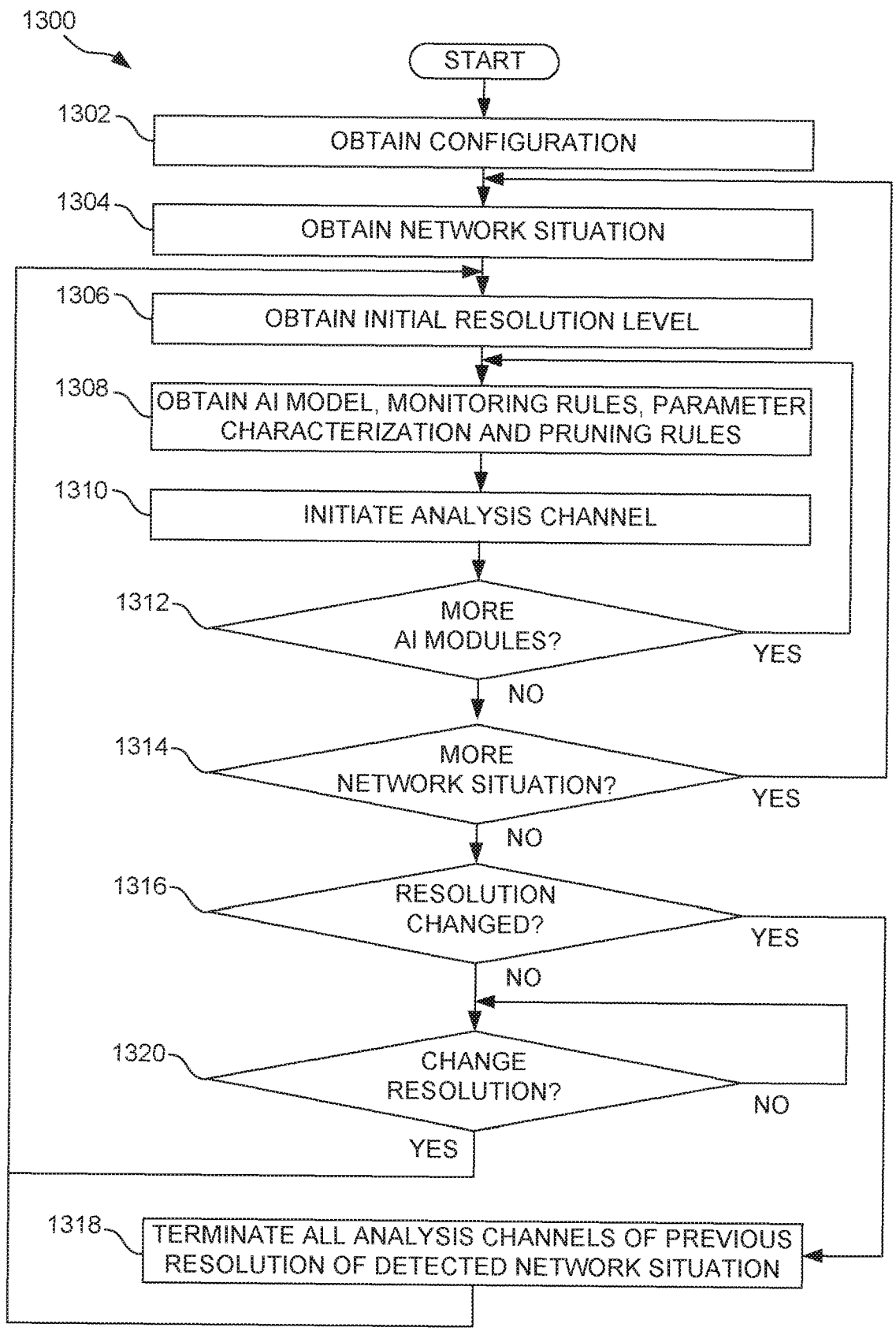
FIG. 13 illustrates a method for a multi-feed run-time process of a network management system, in accordance with one embodiment.

FIG. 13 illustrates a method 1300 for a multi-feed run-time process of a network management system, in accordance with one embodiment. As an option, the method 1300 may be implemented in the context of any one or more of the embodiments set forth in any previous and/or subsequent figure(s) and/or description thereof. Of course, however, the method 1300 may be implemented in the context of any desired environment. Further, the aforementioned definitions may equally apply to the description below.

As shown in FIG. 10 above, the multi feed modules 1030A/1030B may include the parameter pruning N 1016A and/or the parameter pruning M 1016B, the parameter characterizing rules and pruning rules 1018A/1018B, the RT analysis system 226, and the AI-model N 1022A and/or the AI-model M 1022B may operate with a separate and/or independent level of resolution of the RT log data feed N 1020A and/or the RT log data feed M 1020B. The multi-feed run-time manager 1024 may initiate any of the multi feed modules 1030A/1030B for each AI-model 1010, and, in run-time, the network management system may include any number of feed channels (such as the multi feed modules 1030A/1030B) searching the log data 224 in parallel for respective classifiers predicting the development of respective network situations (such as the suspected situation 228). Additionally, as the configuration changes, the network management system may initiate new feed channels (such as the multi-feed modules 1030A/1030B) and close old, unused feed channels. This may be one reason behind the multi-feed run-time process described presently, which may be executed by a multi-feed RT manager 1024.

In operation, the method 1300 begins by obtaining a new network configuration which has been deployed (see operation 1302). Additionally, the method 1300 may also obtain a description of the configuration, as well as the respective SLAs and similar descriptions, resulting in a list of network situations 1002 pertinent and/or associated with the current configuration.

In addition, the method 1300 may then obtain a particular network situation 1002 (see operation 1304) and pass through to operation 1306 to obtain an initial resolution level for scanning for the particular network situation 1002. Further, the method 1300 may obtain, for the particular network situation 1002 and the particular resolution level, a respective AI-model 1010, monitoring rules 248, and parameter characterization of the AI-module and pruning rules (see operation 1308). Further still, the method 1300 may then proceed to step 1310 to initiate a feed channel (such as the multi feed modules 1030A/1030B) for the particular AI-module 1010, as well as a corresponding channel process (as described below in FIG. 14).

Furthermore, the method 1300 may repeat operations 1308 and 1310 until all AI-modules available for the particular network situations 1002 are deployed in their respective channels. For example, per decision 1312, it is determined whether operations 1308 and 1310 need to be applied to any more AI modules. Additionally, the method 1300 may also repeat steps 1304, 1306, 1308, and 1310 until all of the network situations 1002 defined for the current configuration, as well as their respective AI-models 1010, are deployed in their respective channels, in response to, per decision 1314, determining that more network situations are found.

Finally, if a resolution level is not changed (see decision 1316), the method 1300 may proceed to decision 1320 and if it is determined that the resolution should be changed, then the method 1300 returns to operation 1306. If a resolution is changed (for a particular network situation), then per decision 1316, the method 1300 proceeds to operation 1318 and terminates all feed channels (i.e. the multi-feed modules 1030A/1030B) that process the terminated resolution. It should be noted that a resolution level may be changed for a particular network situation 1002 being detected (e.g., a suspected network situation, etc.). In one embodiment, the method 1300 may be repeated whenever a new configuration is determined and deployed.

Figure 14:
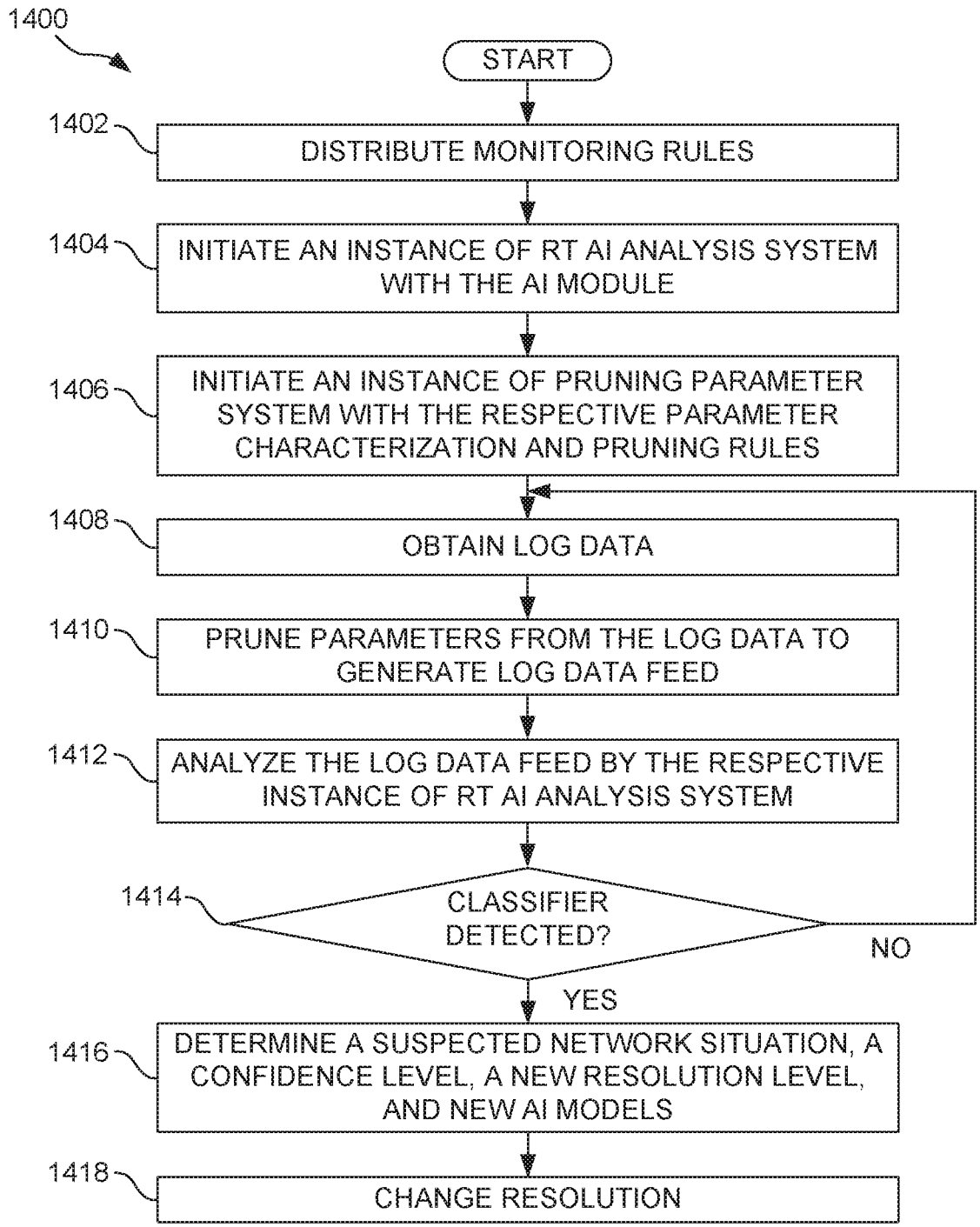
FIG. 14 illustrates a method for a feed channel process, in accordance with one embodiment.

FIG. 14 illustrates a method 1400 for a feed channel process, in accordance with one embodiment. As an option, the method 1400 may be implemented in the context of any one or more of the embodiments set forth in any previous and/or subsequent figure(s) and/or description thereof. Of course, however, the method 1400 may be implemented in the context of any desired environment. Further, the aforementioned definitions may equally apply to the description below.

In operation, the method 1400 may be executed for each feed channel 1030A/1030B separately, independently, and/or in parallel with other channel processes associated with the method 1400. The method 1400 may operate an instance of the RT analysis system 226 with a particular AI-model 1010, and a pruning module 1016A/1016B with respective parameter characterizing rules and pruning rules 1018A/1018B associated with the particular AI-model 1010.

Additionally, the method 1400 may begin by distributing the monitoring rules 248 for the particular AI-model 1010 (see operation 1402), initiating an instance of the RT analysis system 226 with the required AI-module (see operation 1404), and a pruning module 1016A/1016B with respective parameter characterizing rules and pruning rules 1018A/1018B associated with the particular AI-model 1010 (see operation 1406).

Further, the method 1400 may then enter a run-time loop by obtaining the log data 224 from the monitoring system 222 (see operation 1408), pruning (or collecting) parameters from the log data 224 according to the pruning rules (and/or parameter characterizing) to generate the RT log data feed N 1020A and/or the RT log data feed M 1020B (see operation 1410). In addition, the method 1400 may feed the RT log data feed N 1020A and/or the RT log data feed M 1020B to the RT analysis system 226 with the AI-model 1010, which may then analyze the log data feed (see operation 1412).

Finally, the method 1400 may repeat operations 1408, 1410, and 1412 until the AI-model 1010 detects a classifier (see decision 1414), which may result in a suspected network situation having particular confidence level (see operation 1416). Additionally, it is determined, also per operation 1416, a suspected network situation, a confidence level, a new resolution level, and any applicable AI models. Thereafter, a new (typically higher, but possibly lower) resolution level may be introduced (see operation 1418), which may require one or more new AI-models 1010. Furthermore, as herein described in reference to FIG. 13, feed channels may be initiated with the new AI-models 1010 of the new resolution level (see operation 1320), and/or feed channels of the old resolution (see operation 1318) may be terminated.

Figure 15:
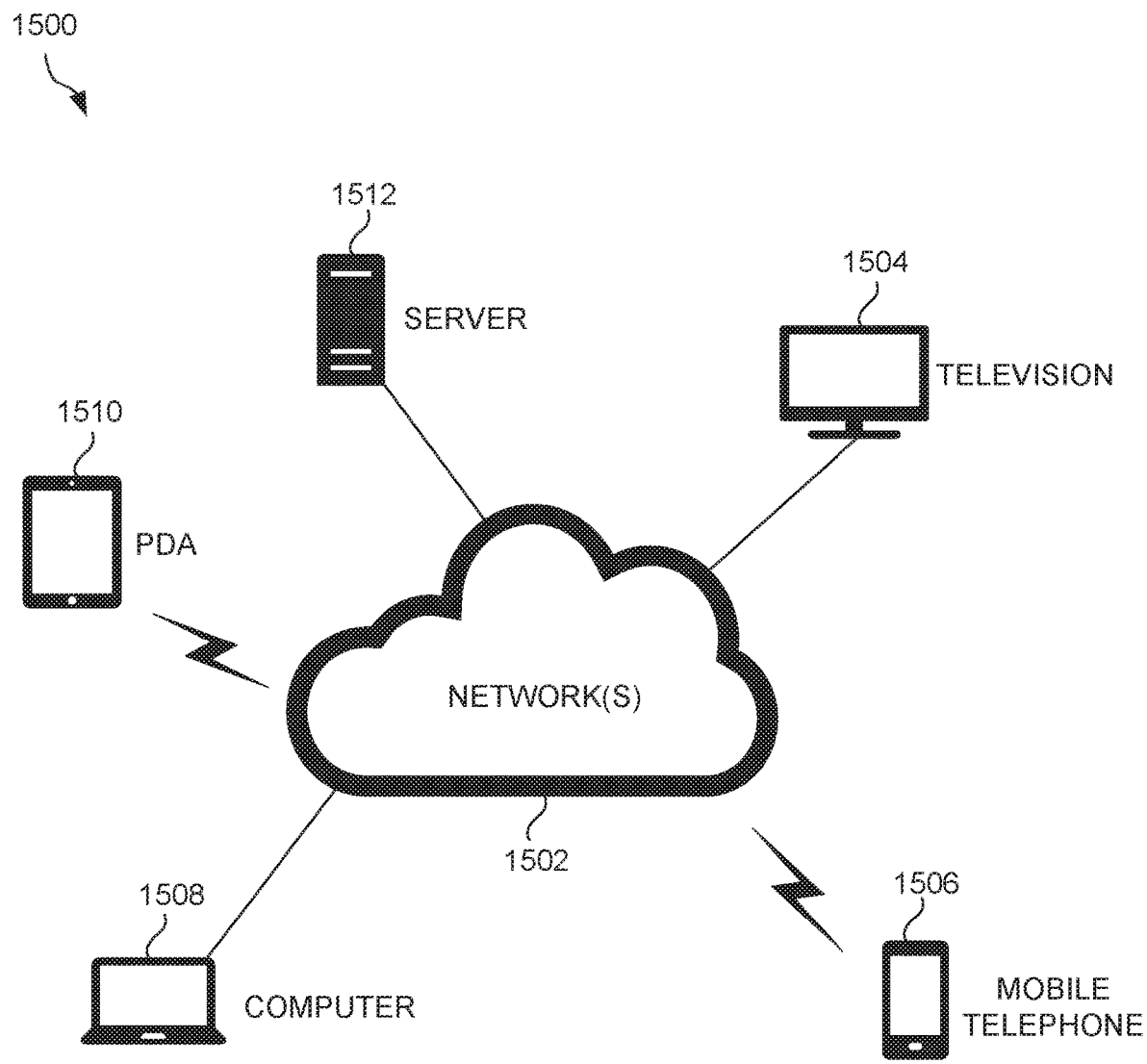
FIG. 15 illustrates a network architecture, in accordance with one possible embodiment.

FIG. 15 illustrates a network architecture 1500, in accordance with one possible embodiment. As shown, at least one network 1502 is provided. In the context of the present network architecture 1500, the network 1502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1502 may be provided.

Coupled to the network 1502 is a plurality of devices. For example, a server computer 1512 and an end user computer 1508 may be coupled to the network 1502 for communication purposes. Such end user computer 1508 may include a desktop computer, lap-top computer, and/or any other type of logic. Still yet, various other devices may be coupled to the network 1502 including a personal digital assistant (PDA) device 1510, a mobile phone device 1506, a television 1504, etc.

Figure 16:
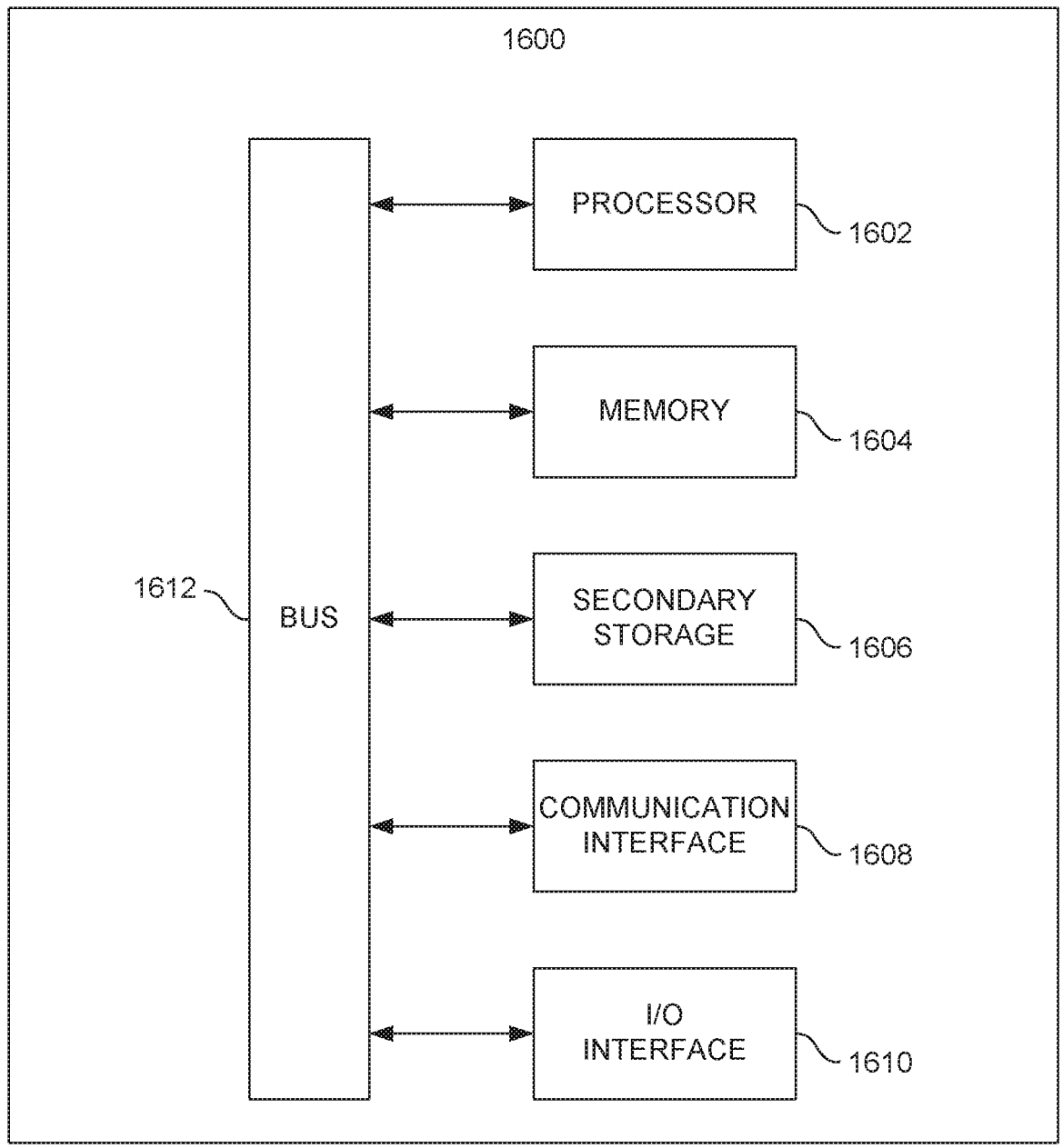
FIG. 16 illustrates an exemplary system, in accordance with one embodiment.

FIG. 16 illustrates an exemplary system 1600, in accordance with one embodiment. As an option, the system 1600 may be implemented in the context of any of the devices of the network architecture 1500 of FIG. 15. Of course, the system 1600 may be implemented in any desired environment.

As shown, a system 1600 is provided including at least one central processor 1602 which is connected to a communication bus 1612. The system 1600 also includes main memory 1604 [e.g. random access memory (RAM), etc.]. The system 1600 also includes a graphics processor 1608 and a display 1610.

The system 1600 may also include a secondary storage 1606. The secondary storage 1606 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1604, the secondary storage 1606, and/or any other memory, for that matter. Such computer programs, when executed, enable the system 1600 to perform various functions (as set forth above, for example). Memory 1604, storage 1606 and/or any other storage are possible examples of non-transitory computer-readable media. It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product comprising computer executable instructions stored on a non-transitory computer readable medium that when executed by a processor instruct the processor to:
    obtain an identification of at least one artificial intelligence (AI) system and an identification of at least one AI model of a plurality of AI models used by the at least one AI system;
    receive a stream of log data;
    create a log data feed adapted to the at least one AI model;
    communicate the log data feed using a corresponding AI model of the plurality of AI models;
    compute a first confidence level for the at least one AI model, the first confidence level representing at least one of:
        a probability of the at least one AI model for detecting a first classifier of the log data feed, or
        a probability of the at least one AI model for detecting a network situation,
        wherein the first classifier precedes the network situation;
    eliminate at least one parameter from the log data feed to form a second log data feed;
    analyze the second log data feed using a corresponding second AI model;
    compute a second confidence level for the corresponding second AI model, the second confidence level representing at least one of:
        a probability of the corresponding second AI model for detecting a second classifier of the second log data feed, or
        a probability of the corresponding second AI model for detecting a second network situation;
    determine that the second confidence level is higher than the first confidence level; and
    eliminate at least one second parameter from the second log data feed to form a third log data feed;
    analyze the third log data feed using a corresponding third AI model;
    compute a third confidence level for the corresponding third AI model, the third confidence level representing at least one of:
        a probability of the corresponding third AI model for detecting a third classifier of the third log data feed, or
        a probability of the corresponding third AI model for detecting a third network situation;
    determine that the third confidence level is higher than the second confidence level; and
    eliminate at least one third parameter from the third log data feed to form a fourth log data feed.

2. The computer program product of claim 1, wherein the corresponding AI model is configured to detect the first classifier in the log data feed.

3. The computer program product of claim 2, wherein the log data includes parameters associated with an operation of network entities of a communication network and a time of reporting.

4. The computer program product of claim 1, wherein the log data feed includes parameters associated with the corresponding AI model.

5. The computer program product of claim 1, wherein the computer program product is configured to obtain, for the corresponding AI model, a plurality of parameters of the log data which are processed by the corresponding AI model.

6. The computer program product of claim 1, wherein the computer program product is configured to refine the log data feed to include only parameters processed by the corresponding AI model.

7. The computer program product of claim 1, wherein the computer program product is configured to simultaneously operate the plurality of AI models, each of the AI models processing a corresponding log data feed.

8. A computer program product comprising computer executable instructions stored on a non-transitory computer readable medium that when executed by a processor instruct the processor to:
    obtain an identification of at least one artificial intelligence (AI) system and an identification of at least one AI model of a plurality of AI models used by the at least one AI system;
    receive a stream of log data;
    create a log data feed adapted to the at least one AI model;
    communicate the log data feed using a corresponding AI model of the plurality of AI models;
    identify a network situation based on the log data;
    identify a resolution level;
    initiate, based on the network situation and the resolution level, a feed channel of the log data feed for a first particular AI model, the feed channel including corresponding monitoring rules and corresponding parameter characterization; and
    repeat the initiation step for all AI models of the plurality of AI models that correspond to the network situation and the resolution level.

9. A method, comprising:
    obtaining an identification of at least one artificial intelligence (AI) system and an identification of at least one AI model of a plurality of AI models used by the at least one AI system;
    receiving a stream of log data;

creating a log data feed adapted to the at least one AI model;
communicating the log data feed using a corresponding AI model of the plurality of AI models;
computing a first confidence level for the at least one AI model, the first confidence level representing at least one of:
a probability of the at least one AI model for detecting a first classifier of the log data feed, or
a probability of the at least one AI model for detecting a network situation,
wherein the first classifier precedes the network situation;
eliminating at least one parameter from the log data feed to form a second log data feed;
analyzing the second log data feed using a corresponding second AI model;
computing a second confidence level for the corresponding second AI model, the second confidence level representing at least one of:
a probability of the corresponding second AI model for detecting a second classifier of the second log data feed, or
a probability of the corresponding second AI model for detecting a second network situation;
determining that the second confidence level is higher than the first confidence level; and
eliminating at least one second parameter from the second log data feed to form a third log data feed;
analyzing the third log data feed using a corresponding third AI model;
computing a third confidence level for the corresponding third AI model, the third confidence level representing at least one of:
a probability of the corresponding third AI model for detecting a third classifier of the third log data feed, or
a probability of the corresponding third AI model for detecting a third network situation;
determining that the third confidence level is higher than the second confidence level; and
eliminating at least one third parameter from the third log data feed to form a fourth log data feed.

10. A device, comprising:
a non-transitory memory storing instructions; and
one or more processors in communication with the non-transitory memory, wherein the one or more processors execute the instructions to:

obtain an identification of at least one artificial intelligence (AD system and an identification of at least one AI model of a plurality of AI models used by the at least one AI system;
receive a stream of log data;
create a log data feed adapted to the at least one AI model;
communicate the log data feed using a corresponding AI model of the plurality of AI models;
compute a first confidence level for the at least one AI model, the first confidence level representing at least one of:
a probability of the at least one AI model for detecting a first classifier of the log data feed, or
a probability of the at least one AI model for detecting a network situation,
wherein the first classifier precedes the network situation;
eliminate at least one parameter from the log data feed to form a second log data feed;
analyze the second log data feed using a corresponding second AI model;
compute a second confidence level for the corresponding second AI model, the second confidence level representing at least one of:
a probability of the corresponding second AI model for detecting a second classifier of the second log data feed, or
a probability of the corresponding second AI model for detecting a second network situation;
determine that the second confidence level is higher than the first confidence level; and
eliminate at least one second parameter from the second log data feed to form a third log data feed; analyze the third log data feed using a corresponding third AI model;
compute a third confidence level for the corresponding third AI model, the third confidence level representing at least one of:
a probability of the corresponding third AI model for detecting a third classifier of the third log data feed, or
a probability of the corresponding third AI model for detecting a third network situation; determine that the third confidence level is higher than the second confidence level; and
eliminate at least one third parameter from the third log data feed to form a fourth log data feed.

* * * * *